(12) United States Patent
Dainoff et al.

(10) Patent No.: US 7,644,024 B2
(45) Date of Patent: Jan. 5, 2010

(54) FINANCIAL INFORMATION DISPLAY SYSTEM

(75) Inventors: Marvin J. Dainoff, Cincinnati, OH (US); Charles A. Dainoff, Cincinnati, OH (US)

(73) Assignee: Cognitive Engineering Associates, LLC, Cincinnati, OH (US)

( * ) Notice: Subject to any disclaimer, the term of this patent is extended or adjusted under 35 U.S.C. 154(b) by 1345 days.

(21) Appl. No.: 10/427,603

(22) Filed: May 1, 2003

(65) Prior Publication Data

US 2004/0220868 A1 Nov. 4, 2004

(51) Int. Cl.
*G06Q 40/00* (2006.01)
(52) U.S. Cl. .............................. 705/36; 705/38; 705/37; 705/35
(58) Field of Classification Search .................... 705/34, 705/35–38; 75/37
See application file for complete search history.

(56) References Cited

U.S. PATENT DOCUMENTS

| | | | |
|---|---|---|---|
| 4,816,208 A | 3/1989 | Woods et al. ............... | 376/259 |
| 5,101,353 A * | 3/1992 | Lupien et al. ................ | 705/37 |
| 5,167,010 A | 11/1992 | Elm et al. ..................... | 395/50 |
| 5,185,696 A | 2/1993 | Yoshino et al. ............. | 364/408 |
| 5,454,104 A | 9/1995 | Steidlmayer et al. ........ | 395/600 |
| 5,675,746 A | 10/1997 | Marshall ...................... | 395/235 |
| 5,689,651 A | 11/1997 | Lozman ...................... | 395/237 |
| 5,859,885 A | 1/1999 | Rusnica et al. .............. | 376/259 |
| 5,880,726 A | 3/1999 | Takiguchi et al. ........... | 345/340 |
| 6,021,397 A * | 2/2000 | Jones et al. ................ | 705/36 R |
| 6,275,229 B1 | 8/2001 | Weiner et al. ............... | 345/339 |
| 6,477,538 B2 | 11/2002 | Yaginuma et al. ........... | 707/102 |
| 2001/0042785 A1* | 11/2001 | Walker et al. ................ | 235/379 |
| 2002/0049713 A1 | 4/2002 | Khemlani et al. ............. | 707/1 |
| 2002/0055899 A1 | 5/2002 | Williams ...................... | 705/37 |
| 2002/0095362 A1 | 7/2002 | Masand et al. ................ | 705/35 |
| 2002/0152148 A1 | 10/2002 | Ebert .......................... | 705/35 |
| 2002/0194095 A1 | 12/2002 | Koren .......................... | 705/35 |
| 2003/0004853 A1 | 1/2003 | Ram et al. .................... | 705/37 |
| 2003/0009411 A1 | 1/2003 | Ram et al. .................... | 705/37 |
| 2003/0014343 A1* | 1/2003 | Jones .......................... | 705/36 |
| 2004/0117302 A1* | 6/2004 | Weichert et al. .............. | 705/40 |

OTHER PUBLICATIONS

E*TRADE'S Flagship Financial Services Location, E*TRADE Center—New York, Named 'Store of the Year' PR Newswire. New York: Jan. 22, 2002. p. 1.*

* cited by examiner

*Primary Examiner*—Frantzy Poinvil
*Assistant Examiner*—Clement Graham
(74) *Attorney, Agent, or Firm*—Wood, Herron, & Evans, LLP

(57) ABSTRACT

A display system for providing financial information regarding publicly traded securities includes a display having seven valuation metrics related to a publicly traded security displayed on a scatter chart. Each metric may be selected to permit a user to view detailed information concerning the metric. A user may successively drill down in the displayed information to obtain finer and finer detailed information related to the security. The display system also provides a comparison of the valuation metrics of several selected securities.

14 Claims, 25 Drawing Sheets

1st Principles ℗

Company: XYZ  
Add to my IP Portfolio? Yes No $g = .078$

= Average Dividend Growth Rate (1997-2001)

= (1998 Dividend Growth Rate + 1999 Dividend Growth Rate + 2000 Dividend Growth Rate + 2001 Dividend Growth Rate)/4

= {[[(1-1998 Dividend Payout Ratio)](1999 ROE)]+[(1-1999 Dividend Payout Ratio)(1999 ROE)]+[(1-2000 Dividend Payout Ratio)(2000 ROE)]+[(1-2001 Dividend Payout Ratio)(2001 ROE)]}/4

= {[[(1-.34)(.25)]+[(1-.87)(.04)]+[(1-.72)(.05)]+[(1-.11)(.15)]}/4

= {[(.66)(.25)]+[(.13)(.04)]+[(.28)(.05)]+[(.89)(.15)]}/4

= [(.165)+(.0052)+(.014)+(.1335)]/4

= .3177/4

Join  
Sign In  
Our Philosophy  
My IP Portfolio  
Transactions  
Newswire  
Hall of Fame  
Links  
Glossary

FINANCIAL INFORMATION DISPLAY SYSTEM

FIELD OF THE INVENTION

The present invention pertains to information display systems, and more particularly to a system for displaying financial information related to securities.

BACKGROUND OF THE INVENTION

In recent years, information related to securities has become more readily available to persons interested in buying or selling stocks and other such securities. Moreover, the proliferation of personal computers and the increased use of the Internet have made information regarding securities widely available to the public. Accordingly, many computer programs have been developed to help traders (both professional and laypersons) to select and trade securities. A downside of the increased availability of information is that persons interested in buying or selling securities often become overwhelmed by the volume of information (information overload) and thus find it difficult to focus and discern useful information from the body of available information.

Conventional computer software or systems designed to facilitate the selection of securities have generally focused on the technical analysis of the securities, based on the price of the security. Specifically, conventional software and computer systems commonly utilize a computation based on current and former stock price to guess what future prices of the stock may be. These systems and methods necessarily depend upon the ability to obtain accurate data regarding a particular security's past and current price. In the past several years, the integrity of this type of data has been compromised due to the actions of executives of certain companies trading the securities, the firms providing accounting services for those companies and the brokerages trading in the stocks themselves. However, even if information regarding a security's price is correct, it is questionable whether past and present price are adequate predictors of the future value of a security.

Another drawback of conventional systems and methods for selecting stocks is related to the display of information to a user of the system. In this regard, the abundance of information often makes it difficult for users to view and understand critical information, and to comprehend relationships between the various types of information related to the securities. There is thus a need for a system and method of displaying financial information of publicly traded securities which overcomes drawbacks of the prior art, such as those discussed above.

SUMMARY OF THE INVENTION

The present invention provides a financial information display system that permits users to view and understand financial information related to securities to thereby facilitate making investment decisions related to the securities. In one aspect of the invention, various valuation metrics for a selected security are displayed simultaneously in a format that permits users to perceive quantitative relationships of the individual valuation metrics, as well as interrelationships among the valuation metrics. The display system lends itself to implementation on a computer system. In one aspect of the invention, the display system may be utilized to provide users with financial information related to publicly traded securities via a web page over the Internet.

In another aspect of the invention, the valuation metrics are displayed as points on a scatter chart having a scaled vertical axis and a zero reference horizontal axis. Information related to the determination of the valuation metrics is displayed when a user selects a particular metric for which further information is desired. Advantageously, a user may continue to view finer and finer detailed information related to the valuation metric, down to the raw financial data used by the display system.

In another aspect of the invention, the display system permits comparison of various selected securities by displaying valuation metrics determined for each security in a table.

In yet another aspect of the invention, the display system may provide users with the ability to link to a separate system adapted to provide services related to the securities, such as a system adapted to permit buying and selling of selected securities. These and other advantages, objectives and features of the present invention will become more readily apparent to those of ordinary skill upon review of the following detailed description and accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIGS. 4-46 illustrate exemplary display screens providing additional information related to the selected security, according to the present invention.

DETAILED DESCRIPTION

Figure 1:
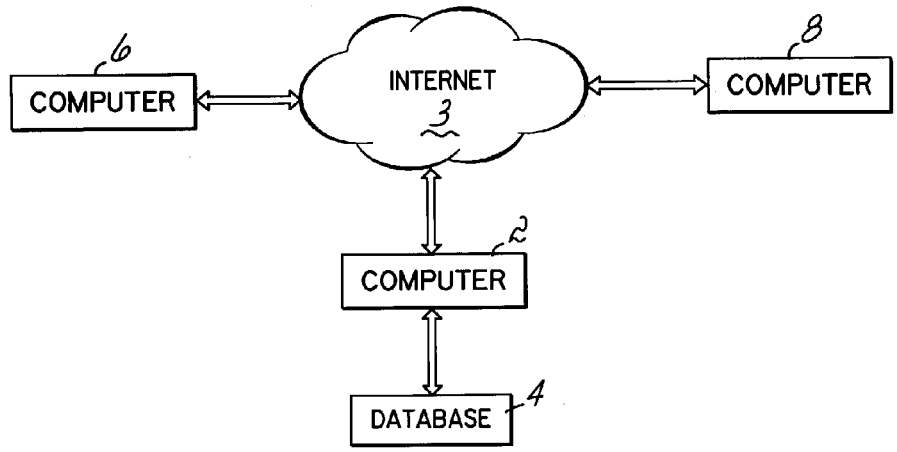
FIG. 1 is a schematic illustration depicting an exemplary configuration of computers according to the present invention.

The present invention is particularly suited to be implemented on a computer system, such as the exemplary system shown in FIG. 1. The system may comprise a single first computer 2 that contains, in memory, necessary financial information of publicly traded securities, or the first computer 2 may be linked to a data base 4 which contains the financial information. Alternatively, the system may comprise a first computer 2 which is in communication with a second computer 6 whereby a user at the second computer 6 is provided with the financial information according to the present invention via communication with the first computer 2. This arrangement is particularly suited to an embodiment where a user at the second computer 6 accesses the first computer 2 over a network, such as the Internet 3, to obtain financial information on publicly traded securities, as will be discussed in more detail below. In another exemplary embodiment, at least one of the first and second computers may be in communication with a third computer 8 which is adapted to facilitate performing external services, such as buying or selling selected securities.

To provide financial information to a user in a useful format, concepts and methodologies of Cognitive Work Analysis, Information Visualization, and Usability Engineering have been applied to develop the display system of the present invention. Starting with raw financial data, such as data from quarterly financial reports filed with the Securities and Exchange Commission (SEC), Cognitive Work Analysis was employed to establish a hierarchical structure comprising overall investment goals, valuation principles, valuation components, and data regarding individual securities. In particular, an overall investment philosophy based upon the principles of fundamental analysis was selected to evaluate the financial information for selected publicly traded securities. Within this investment philosophy, seven generally accepted valuation metrics were selected to achieve the analysis goals. These seven valuation metrics are discussed in more detail below and include a Dividend Discount Model valuation, a Free Cash Flow to Equity valuation, a Free Cash Flow to the Firm valuation, a Price Per Earnings valuation, a Price Per Cash Flow valuation, a Price Per Book Value valuation, and a Price Per Sales valuation.

The Dividend Discount Model valuation represents the present value of a company based on the amount of dividends it will pay over time. The Free Cash Flow to Equity valuation represents the present value of a company based on the cash flows the company has after: (1) meeting its interest and principal payments; and (2) providing for capital expenditures to maintain existing assets and to create new assets for future growth. The Free Cash Flow to the Firm valuation is the present value of a company's cash flow s to its stockholders and bondholders, after taking into account the potential tax liability from earnings, capital expenditures, and working capital requirements. The Price Per Earnings valuation is a comparison of a company's present value to its expected earnings. The Price Per Cash Flow valuation compares a company's present value to its expected cash flows. The Price Per Book Value valuation is a comparison of a company's present value to the company's assets, less its liabilities. The Price Per Sales valuation is a comparison of a company's present value to its expected sales. Formulas for calculating these various valuations are well known in the art and the values which may be entered into the formulas for a particular publicly traded security are available, for example, from databases containing financial report information from the SEC, such as the Electronic Data Gathering, Analysis and Retrieval system (EDGAR®).

Having this hierarchical structure, potential investor actions are considered. For example, investors may desire to visualize all seven valuation metrics for a given security simultaneously in order to perceive a snapshot of a particular security's value. An advantage to displaying all seven valuation metrics simultaneously in a manner easily comprehensible to the user is that this display provides a sense of context with regard to the company, i.e. providing the "big picture" regarding the company's overall financial condition. An investor may also desire to compare various snapshots from different securities. Alternatively, an investor may want to compare a particular valuation against a company's stock price. As another example, an investor may desire to "drill down" into the component equations and data for a given valuation metric to further analyze and understand that valuation metric. As yet another example, an investor may desire to drill down into a given valuation metric's components in order to compare those components with those of another company's. These and other potential investor actions may be derived by studies from industrial psychology and industrial engineering on task behavior, as well as investment theory concerning the information people use—and the ways in which they use it—to make investment decisions.

Finally, Information Visualization and Usability Engineering are applied to develop graphic screen formats that support the identified investor action components resulting from the analysis. For example, the requirement to visualize a snapshot of the seven valuation metrics simultaneously required the design of a graphic interface in which all seven metrics can be comprehended by the user at the same time. This requirement is met by utilizing a screen display in which each metric is represented as one of seven points on a scatter chart. As another example, the requirement to compare snapshots of different companies may be achieved, for example, by a display in which the metrics for various selected securities are displayed side-by-side on the screen. The requirement of permitting the investor to drill down for detailed information regarding a specific valuation metric may be achieved by establishing links on the display that direct a user to another display containing the desired information. As result of the aforementioned process, the display system of the present invention was developed, as described in more detail below.

Figure 2:
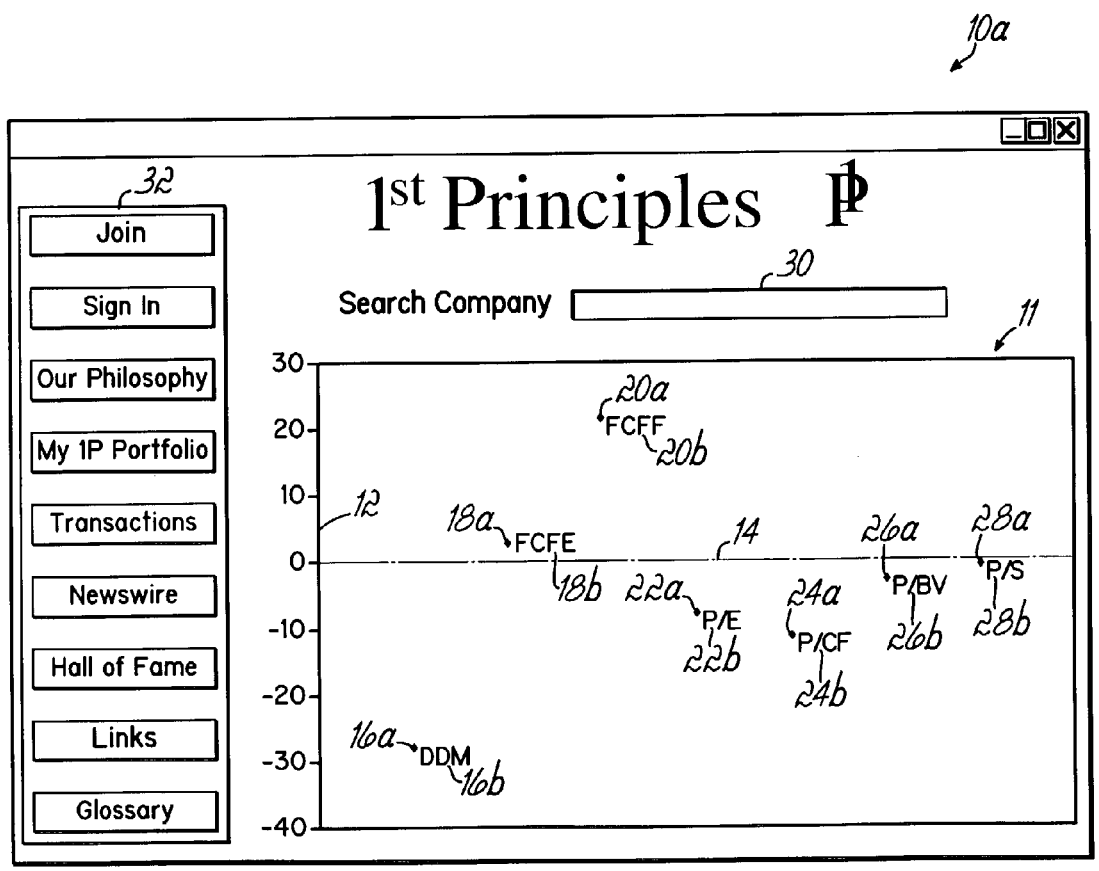
FIG. 2 illustrates an exemplary display screen according to the present invention.

FIG. 2 depicts an exemplary display screen 10a of a computer configured to implement the financial information display system of the present invention. The display screen 10a displays a scatter chart 11 having a vertical axis 12, subdivided to provide a numerical reference scale, and a horizontal zero reference line 14. Advantageously, one or more metrics for valuing a selected security may be displayed on the scatter chart 11 of the display screen 10a. In the exemplary embodiment shown, seven metrics are displayed as points on the scatter chart 11. These metrics include a Dividend Discount Model valuation 16a, a Free Cash Flow To Equity valuation 18a, a Free Cash Flow To the Firm valuation 20a, a Price Per Earnings valuation 22a, a Price Per Cash Flow valuation 24a, a Price Per Book Value valuation 26a, and a Price Per Sales valuation 28a. Adjacent each of the valuations 16a-28a, a corresponding identifier tag 16b-28b identifies the corresponding metric to facilitate comprehension by a user.

The display screen 10a further includes an input field 30 whereby a user may enter parameters for searching and displaying financial information related to a particular publicly traded security. To access and display financial information for a particular publicly traded security, a user may enter a company name or stock symbol in the input field 30. Display screen 10a may further include a menu 32 having user selectable menu items permitting the user to perform a particular task.

Figure 3:
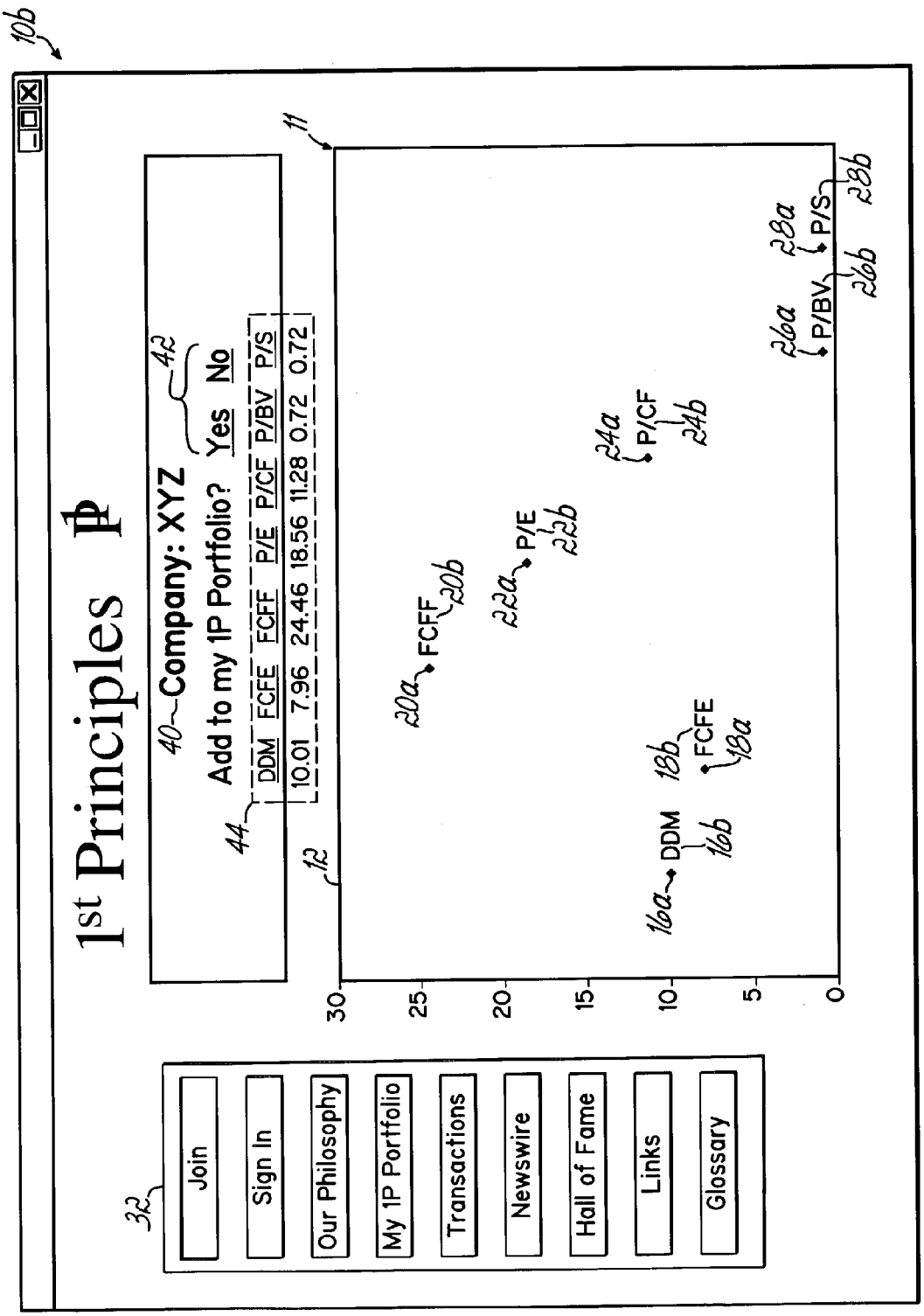
FIG. 3 is an exemplary display, similar to FIG. 1, illustrating the display of financial information related to a particular security.

Referring now to FIG. 3, there is shown a display screen 10b illustrating an exemplary display of financial information for a selected "Company XYZ" resulting from a Company XYZ identifier entered by a user in input field 30 of the display screen 10a of FIG. 2. Upon receiving a command from the user to display financial information for Company XYZ, a database containing financial information related to Company XYZ is accessed and the seven valuation metrics 16a-28a are computed and displayed on scatter chart 11. The display screen 10b further provides an identification of the selected security 40 and a field 42 providing the user with an option to perform further action, for example, to add the financial information for the selected security to a portfolio. The display screen 10b also shows a numeric value for each of the seven metrics 16a-28a provided on scatter chart 11 in field 44. Advantageously, the display system of the present invention allows users to selectively access and examine further detail of the seven valuation metrics 16a-28a for the selected security. In essence, the system allows users to "drill down" from the valuation metrics 16a-28a to examine basic financial information as well as the equations used to calculate those metrics. In the exemplary embodiment, the user may access this detailed information by selecting a desired metric 16a-28a, for example, by moving a cursor on the display screen 10b to the desired metric and selecting the desired metric, such as by clicking a mouse button or depressing a key on a keyboard.

Figure 4:
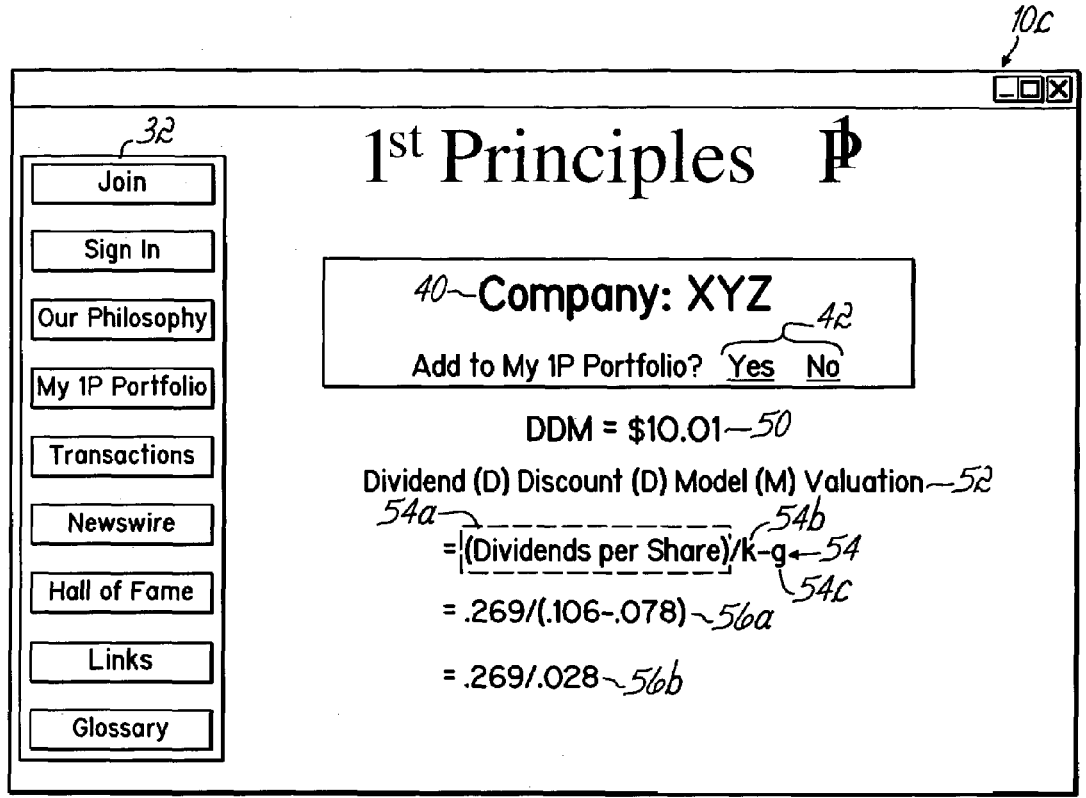

Referring now to FIGS. 4-46, progressively detailed information regarding the selected security that is displayed when a user selectively drills down from the seven valuation metrics 16a-28a will now be discussed. FIG. 4 depicts an exemplary display screen 10c that is returned when a user selects the Dividend Discount Model valuation metric 16a from the display of FIG. 3. After the Dividend Discount Model valuation metric 16a has been selected, display screen 10c displays the identifier 16b ("DDM") for the metric and the numeric value for the metric in field 50. Field 52 provides the name of the valuation metric. A formula for calculating the Dividend Discount Model valuation metric is provided in field 54, and includes user selectable parameters 54a, 54b, and 54c which may be selected by the user to drill down for further information. The numeric values representing the parameters are entered into the formula of field 54 are provided in field 56a and subsequent calculations for determining the Dividend Discount Model valuation metric are displayed in field 56b.

Figure 5:
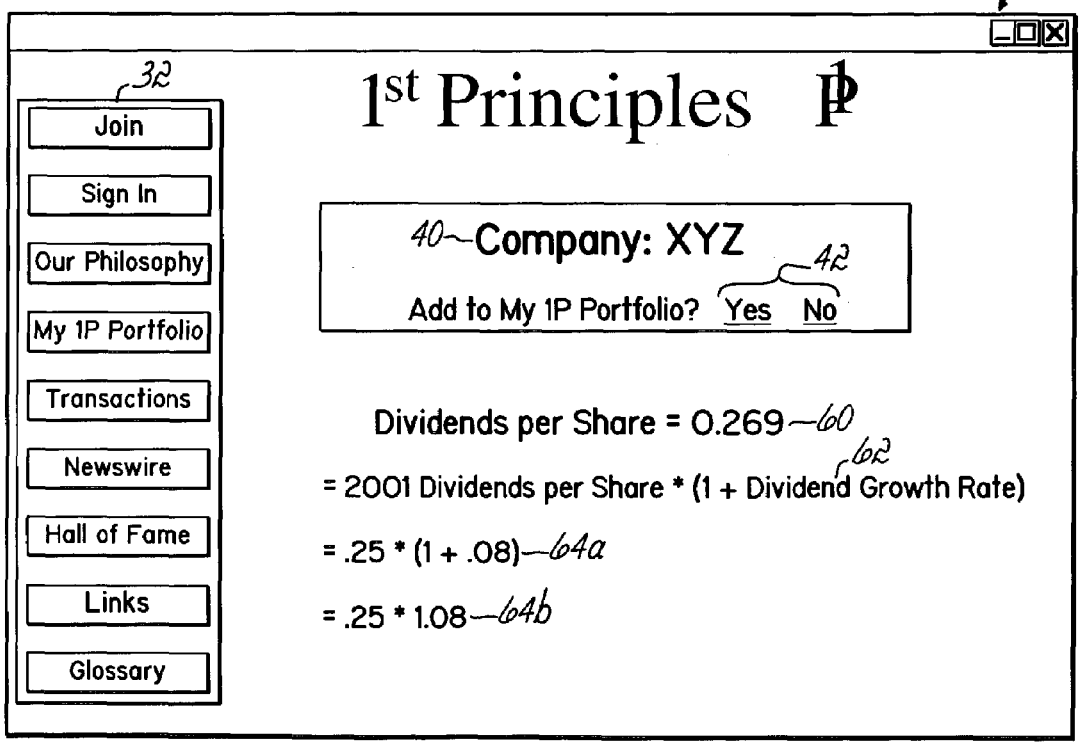

FIG. 5 depicts an exemplary display screen 10d which is returned when a user selects the Dividends Per Share parameter 54a from field 54 of FIG. 4. Field 60 identifies the selected parameter and the numeric value calculated for the Dividends Per Share parameter. The formula used to calculate the Dividends Per Share parameter is displayed in field 62. Numeric values representing the parameters are entered into the formula of field 62 are provided in field 64a, and a successive calculation of the parameter is displayed in 64b.

Figure 6:
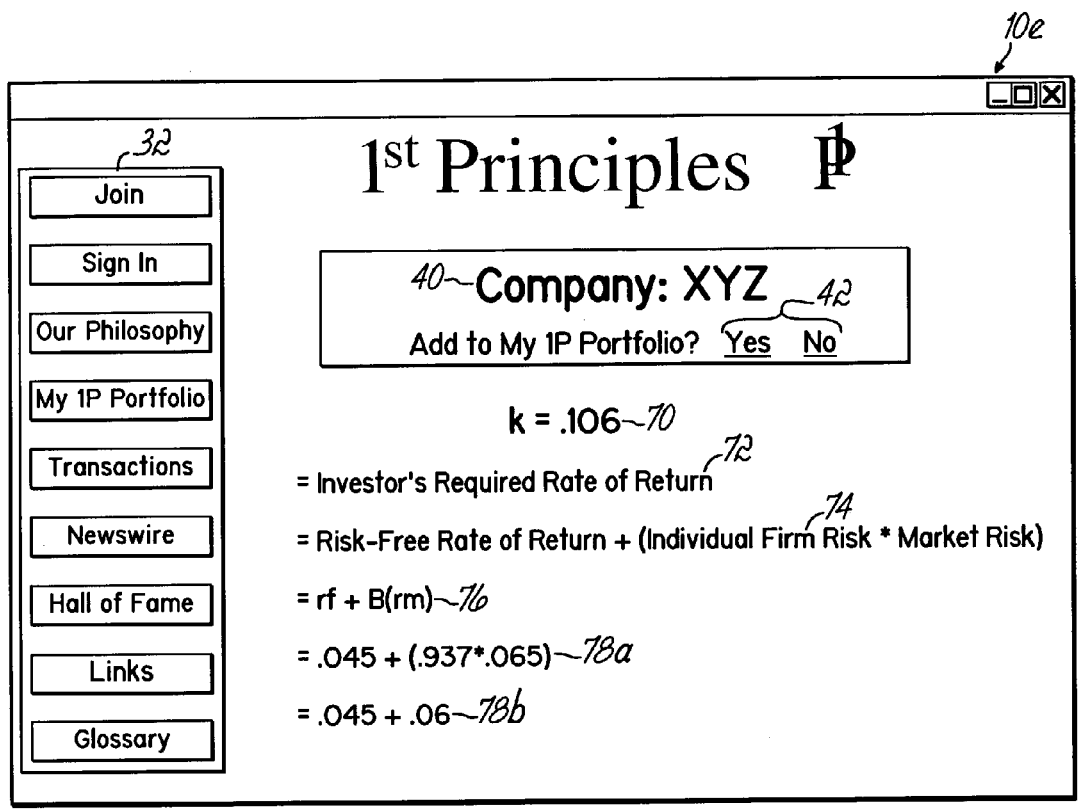

Referring now to FIG. 6, there is shown an exemplary display screen 10e returned when a user selects parameter "k" 54b from field 54 of FIG. 4. Parameter "k" and its numeric value are displayed in field 70, and field 72 identifies this parameter as the Investor's Required Rate Of Return. The formula for calculating the Required Rate Of Return is displayed in field 74. Field 76 displays a shorthand notation for the formula of field 74, and numeric values representing the parameters are entered into the formula in field 78a. Field 78b shows a successive calculation for determining the numeric value displayed in field 70.

Referring now to FIG. 7, there is shown an exemplary display screen 10f depicting the information displayed when a user selects parameter 54c from field 54 of FIG. 4. Field 80 displays the parameter and its calculated numeric value. Field 82 identifies this parameter as the Average Dividend Growth Rate from 1997 to 2001. Fields 84 and 86 display formulas used to determine the value shown in field 80. Field 86 contains user selectable parameters 86a-86h that may be selected to allow a user to drill down for further information regarding the components of the formula. Fields 88a-88d display the numeric values representing the parameters and entered into the formula of field 86, and successive calculations of the formula to obtain the numeric value displayed in field 80.

Figure 8:
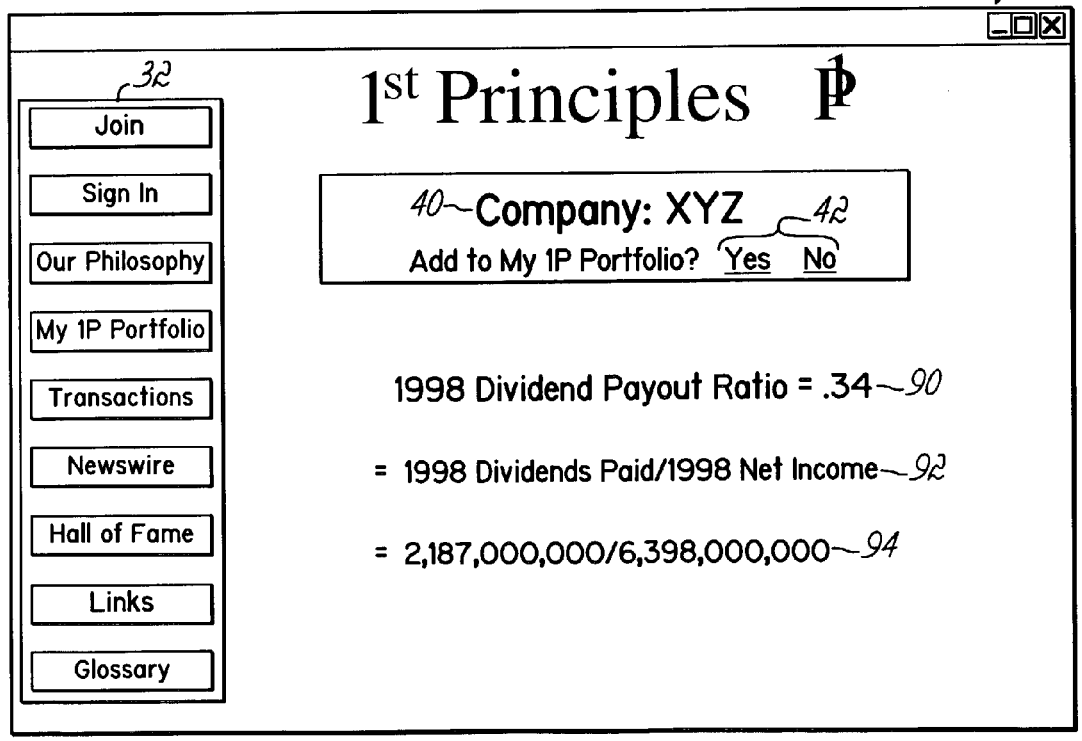
Figure 9:
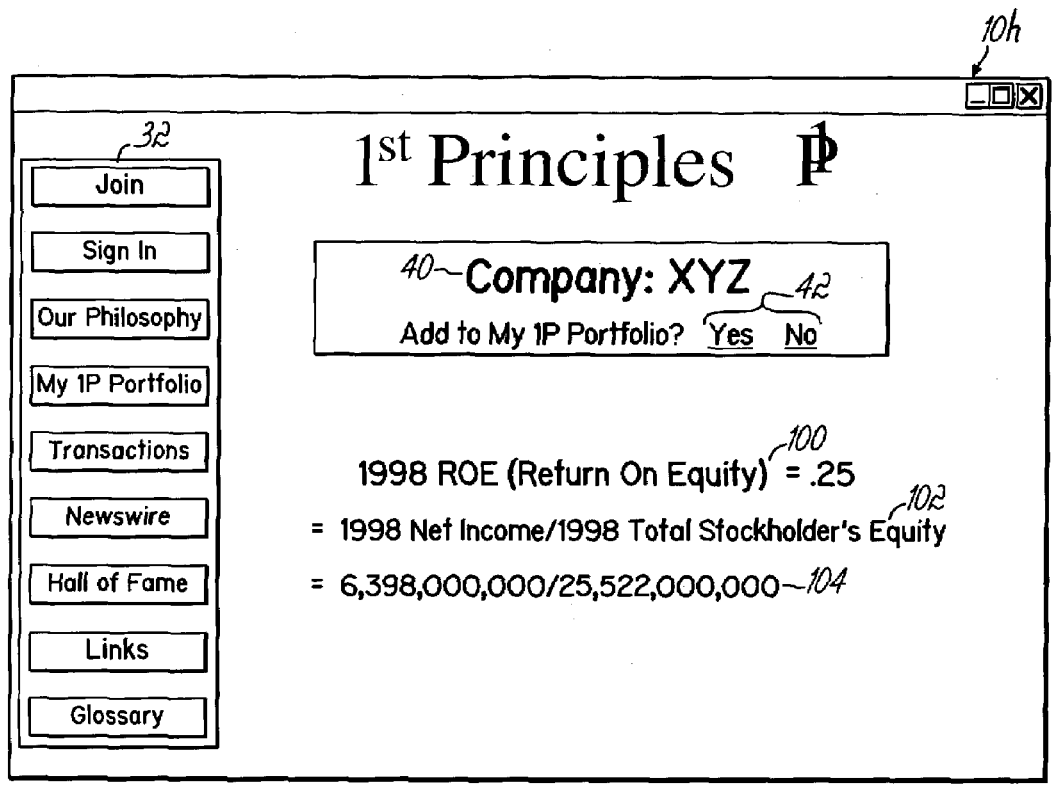
Figure 10:
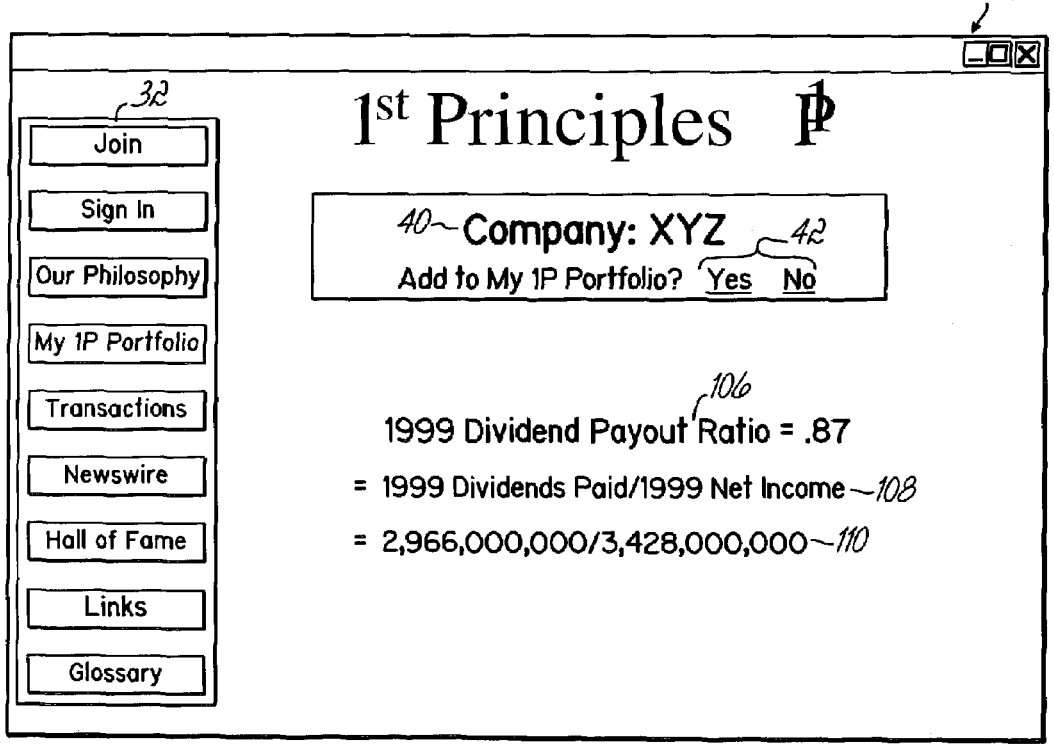
Figure 11:
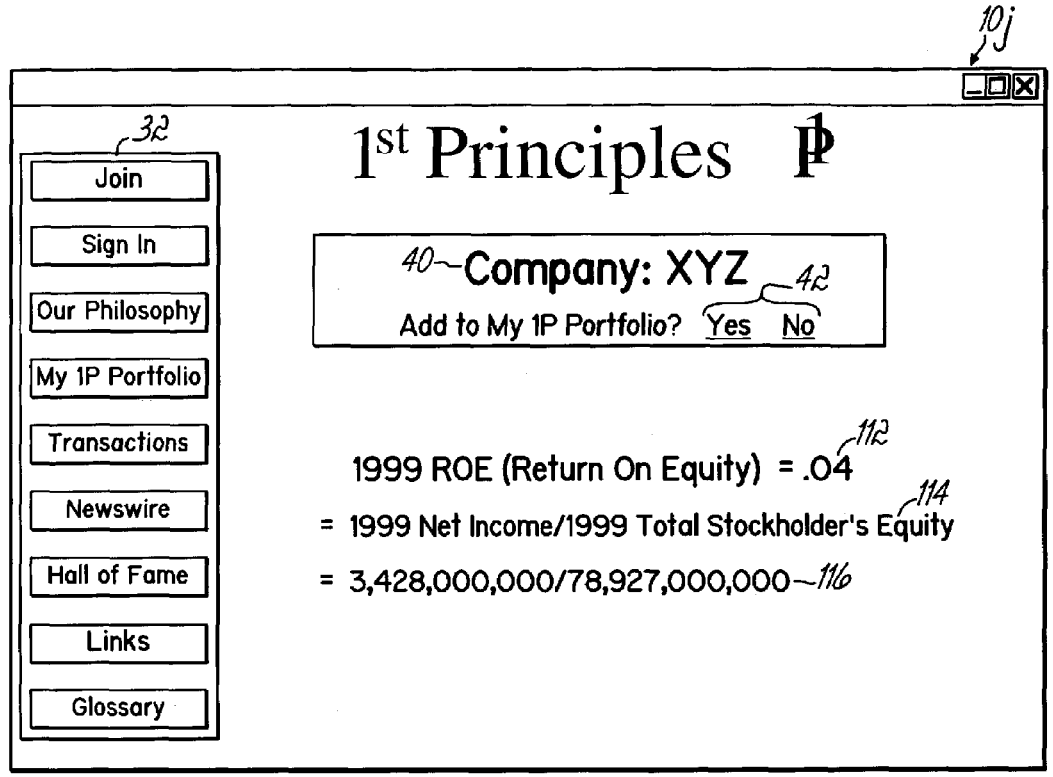
Figure 12:
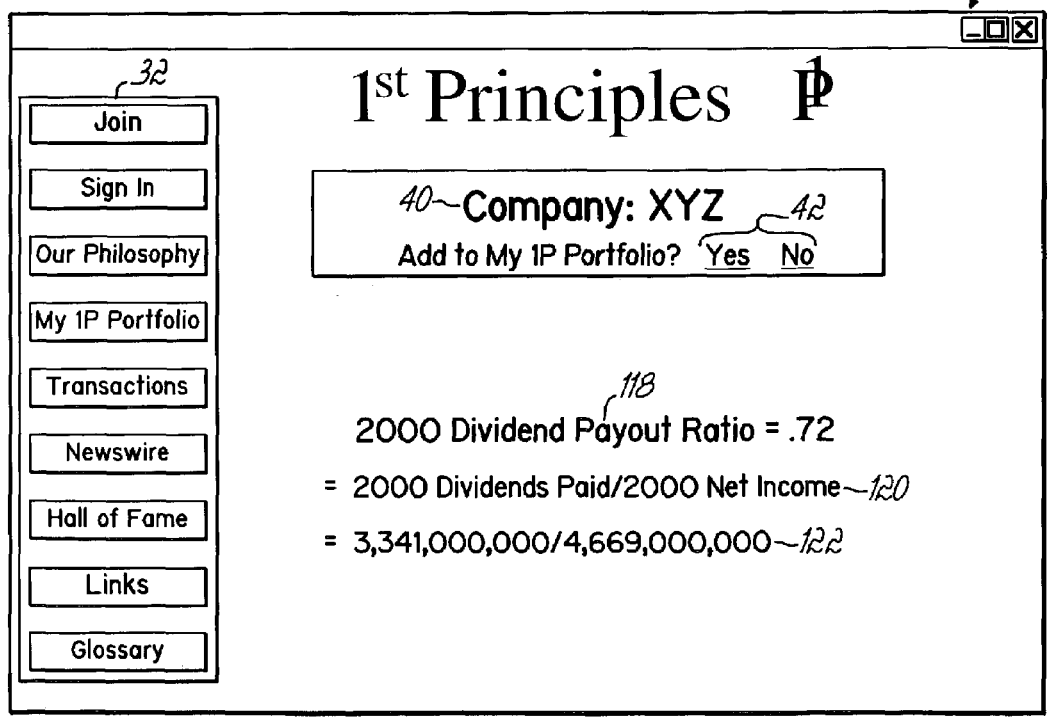
Figure 13:
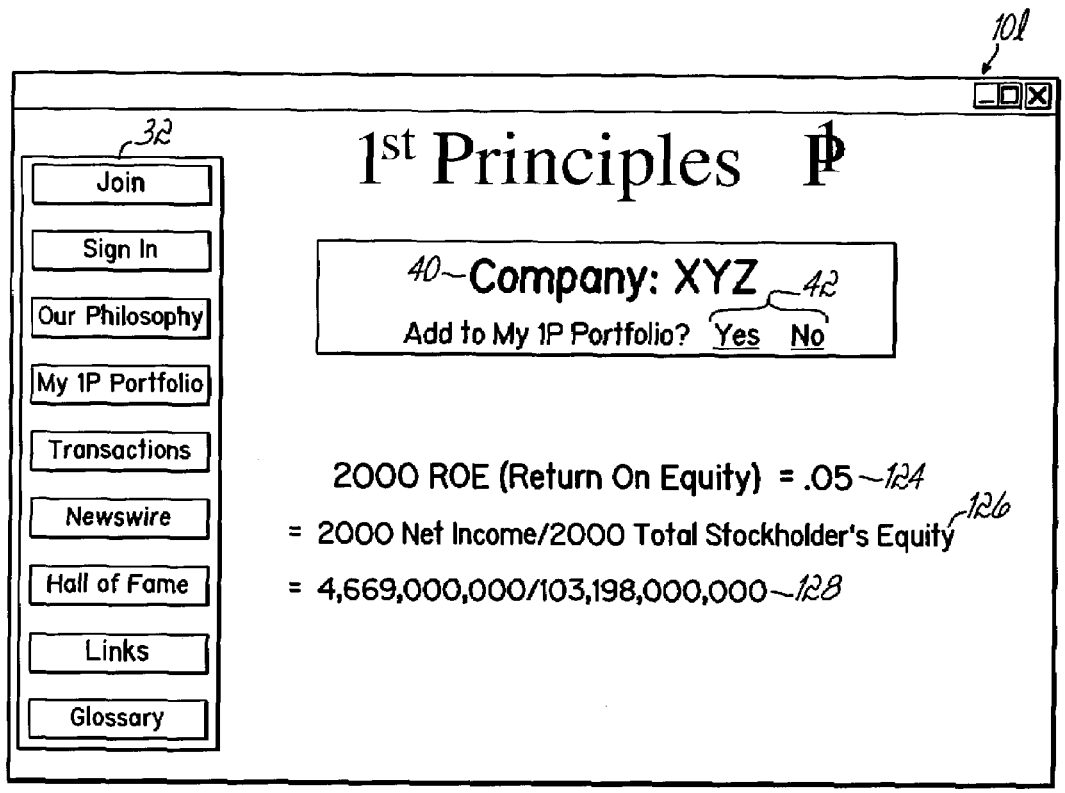
Figure 14:
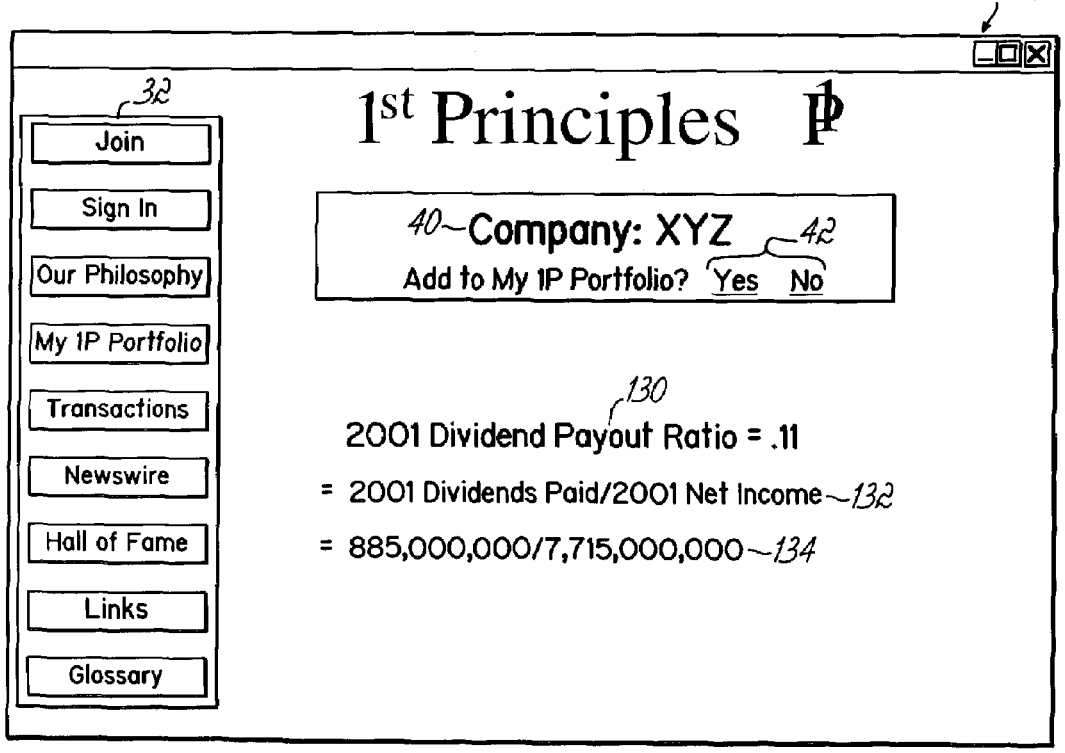
Figure 15:
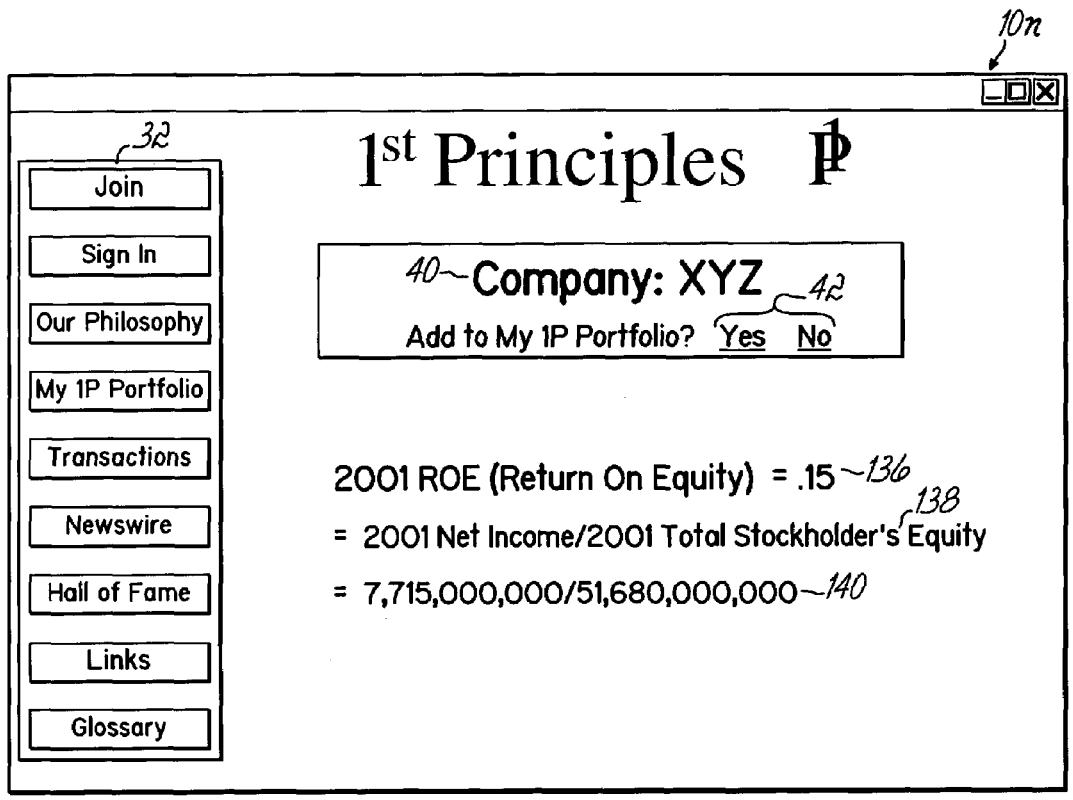

Referring now to FIG. 8, exemplary display screen 10g illustrates the information displayed when a user selects the 1998 Dividend Payout Ratio parameter 86a from field 86 of FIG. 7. In FIG. 8, the parameter identifier and value are displayed in field 90. Field 92 displays the formula for determining the 1998 Dividend Payout Ratio shown in field 90, and field 94 displays the numeric values representing the parameters and entered into the formula of field 92. Similarly, FIGS. 10, 12 and 14 illustrate exemplary display screens 10i, 10k, and 10m, respectively, which depict the information returned when a user selects parameters 86c, 86e, and 86g, respectively, from field 86 in FIG. 7. In these figures, fields 106, 118, and 130 identify the selected parameters as 1999 Dividend Payout Ratio, 2000 Dividend Payout Ratio, and 2001 Dividend Payout Ratio, respectively, and display the numeric values for the parameters. Fields 108, 120, and 132 show the formulas used to calculate the respective Dividend Payout Ratios, and fields 110, 122, and 134 show the numeric values representing the parameters and entered into the formulas.

Referring now to FIGS. 9, 11, 13 and 15, there are shown exemplary display screens 10h, 10j, 10l, and 10n that are returned when a user selects parameters 86b, 86d, 86f, and 86h from field 86 in FIG. 7. Fields 100, 112, 124, and 136 identify the selected parameters as the 1998 ROE (return on equity), 1999 ROE, 2000 ROE, and 2001 ROE, respectively, and the associated values for those parameters. The formulas used to calculate the parameters in fields 100, 112, 124, and 136 are displayed in fields 102, 114, 126, and 138, and the numeric values representing the parameters and entered into the formulas are displayed in fields 104, 116, 128, and 140.

Figure 16:
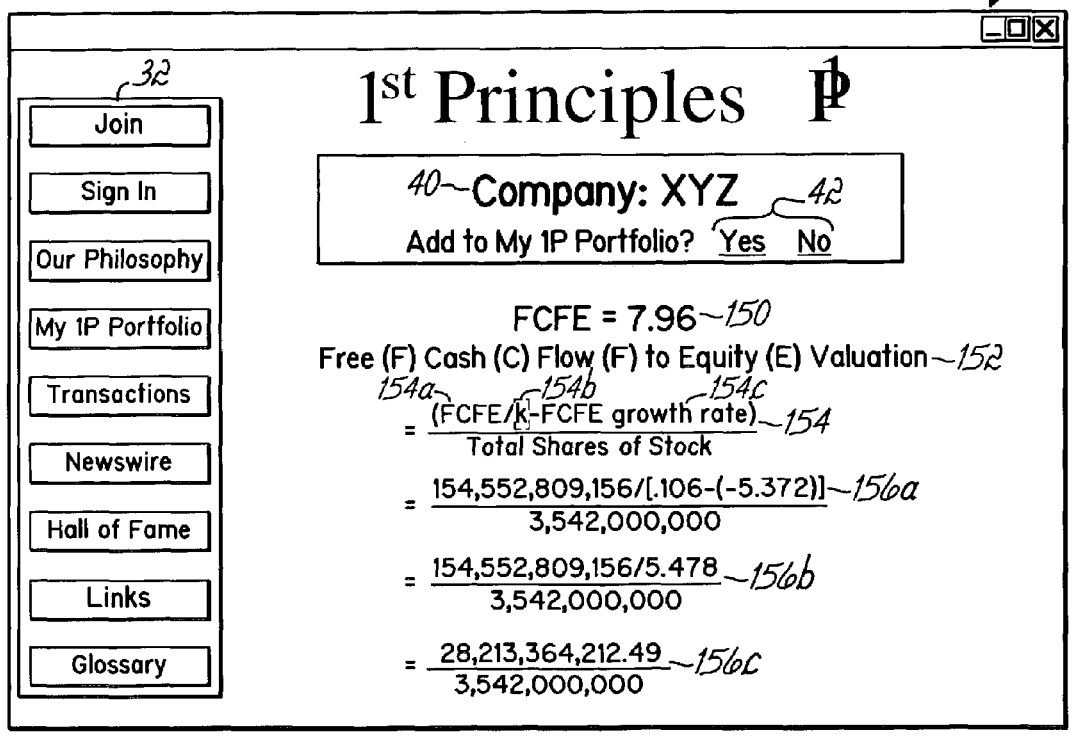

Referring now to FIG. 16, there is shown an exemplary display screen 10o returned when a user selects the Free Cash Flow to Equity valuation metric 18a on the scatter chart 11 shown in FIG. 3. The identifier tag "FCFE" and the numeric value calculated for the valuation metric are displayed in field 150. Field 152 identifies the selected valuation metric as the Free Cash Flow to Equity Valuation, and field 154 provides the formula used to calculate the Free Cash Flow to Equity valuation metric. Field 154 includes user selectable parameters 154a, 154b, and 154c whereby a user may selectively drill down to view detailed information regarding the valuation metric. Numeric values representing the parameters are entered into the formula shown in field 154, and successive calculations used to determine the valuation metric are displayed in fields 156a-156c.

Figure 17:
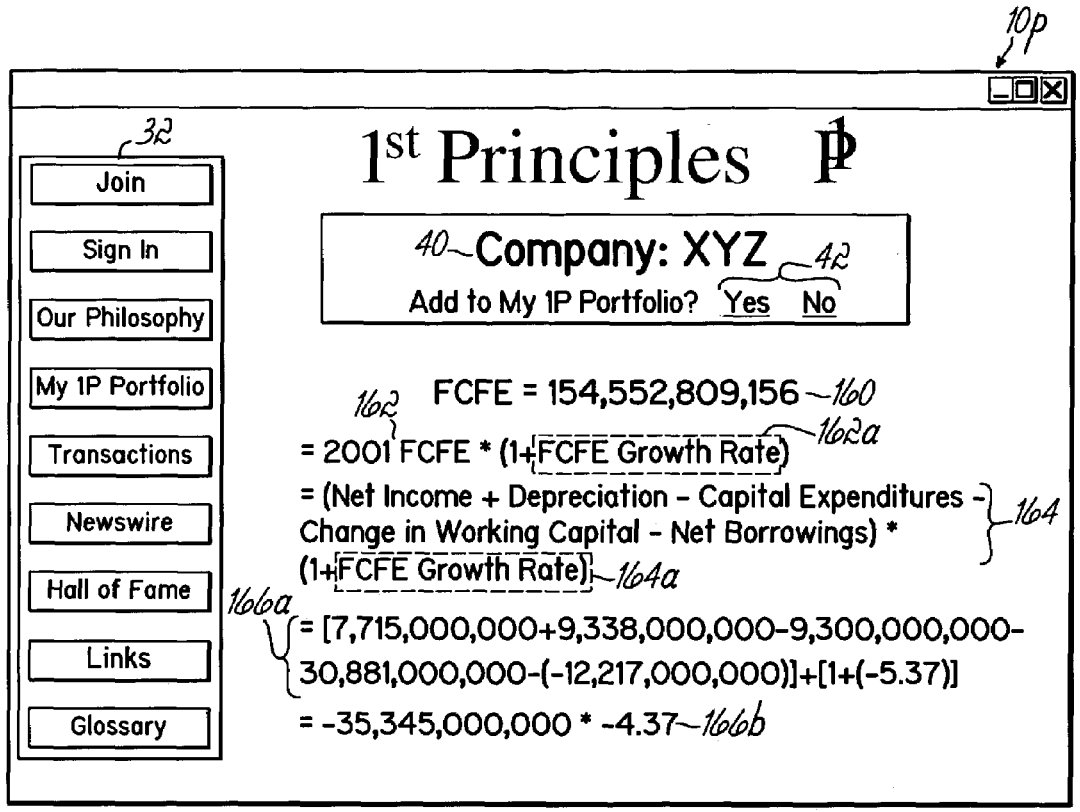

In FIG. 17, there is shown an exemplary display screen 10p returned when a user selects the FCFE parameter 154a from the formula displayed in field 154 of FIG. 16. The selected parameter and its associated numeric value are provided in field 160 of FIG. 17. Fields 162 and 164 provide details of the formula utilized to determine the selected parameter, and contain user selectable parameters 162a and 164a. Fields 166a and 166b display the numeric values representing the parameters and entered into the formulas along with the subsequent calculations performed to determine the FCFE parameter.

Figure 18:
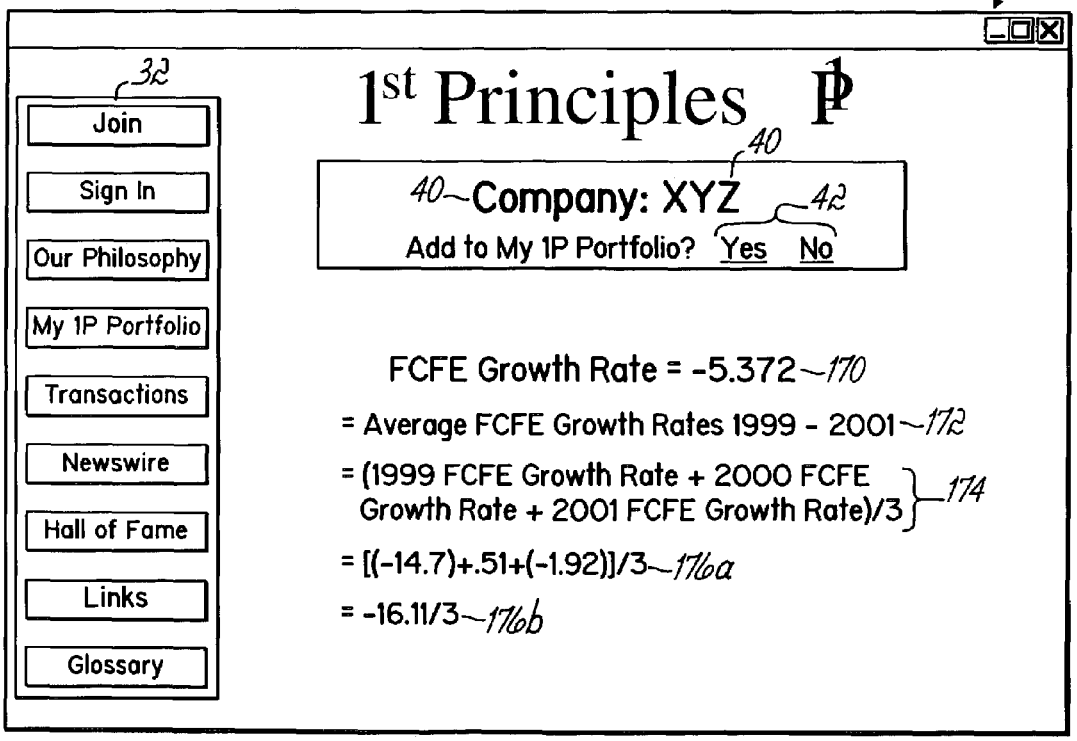

Referring now to FIG. 18, there is shown an exemplary display screen 10q returned when a user selects the FCFE Growth Rate parameter 154c from field 154 of FIG. 16, or parameters 162a or 164a from fields 162 and 164 in FIG. 17. Field 170 displays the parameter name and its calculated numeric value. Fields 172 and 174 display the formulas used to determine the FCFE Growth Rate, and fields 176a and 176b display the numeric values representing the parameters and entered into these formulas, along with subsequent calculations.

When a user selects parameter 154b ("k") in field 154 of FIG. 16, the exemplary display screen 10e of FIG. 6 is returned, as discussed above.

Figure 19:
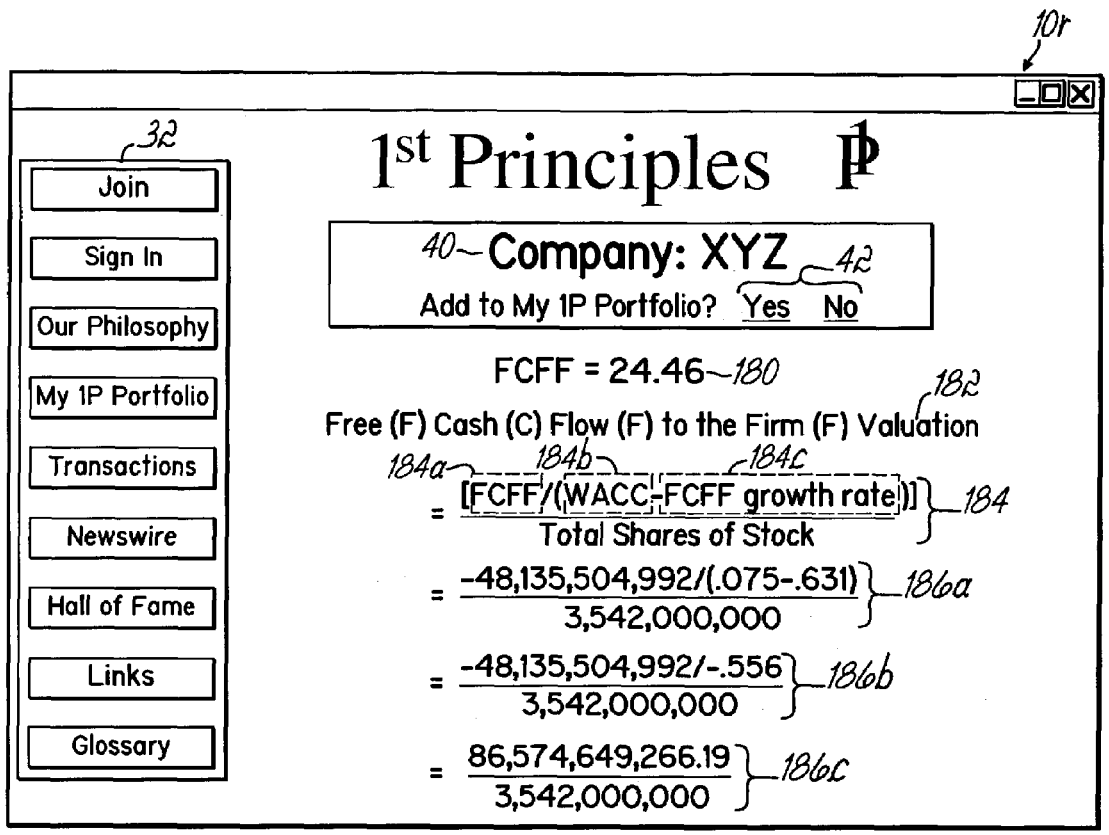

Referring now to FIG. 19, there is shown an exemplary display screen 10r provided when a user selects the FCFF (Free Cash Flow to the Firm) valuation metric 20a displayed on scatter chart 11 of FIG. 3. Field 180 of FIG. 19 provides the identifier for the selected valuation metric and its associated numeric value. Field 182 displays the name of this valuation metric as "Free Cash Flow to the Firm Valuation." Field 184 displays the formula utilized in determining the Free Cash Flow to the Firm valuation, and includes user selectable parameters 184*a* (FCFF), 184*b* (WACC) and 184*c* (FCFF Growth Rate). Fields 186*a*-186*c* display the numeric values represented by the parameters and entered into the formula of field 184, along with subsequent calculations for determining the Free Cash Flow to the Firm valuation.

Figure 20:
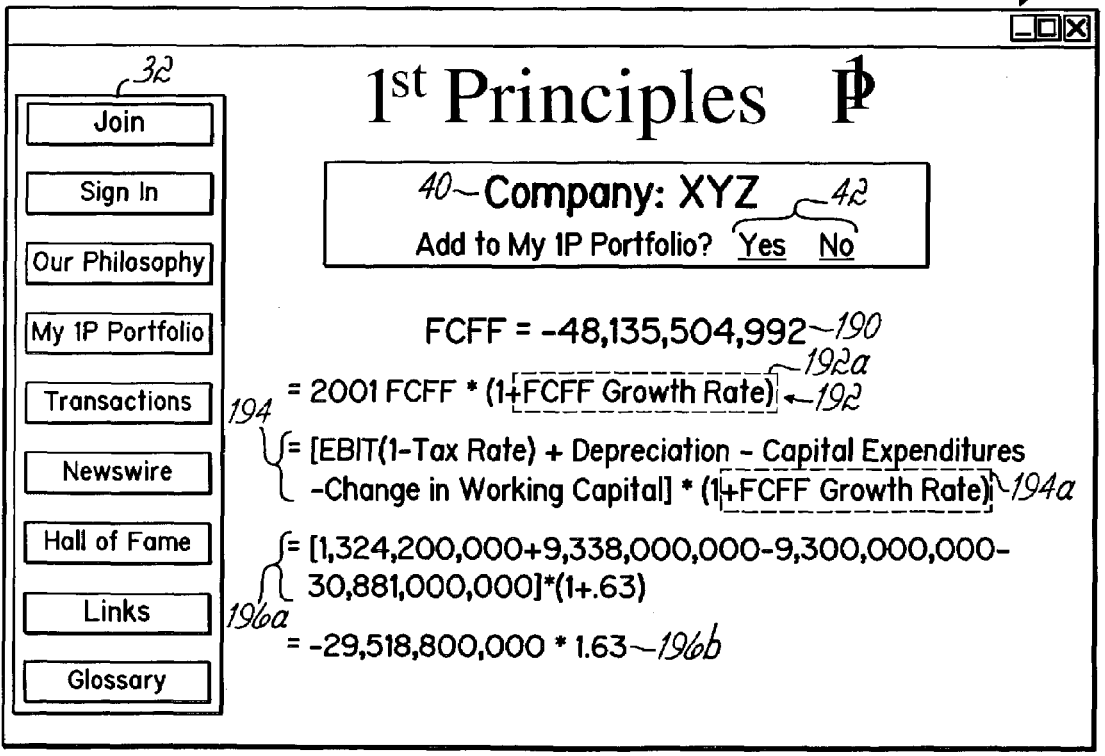
Figure 34:
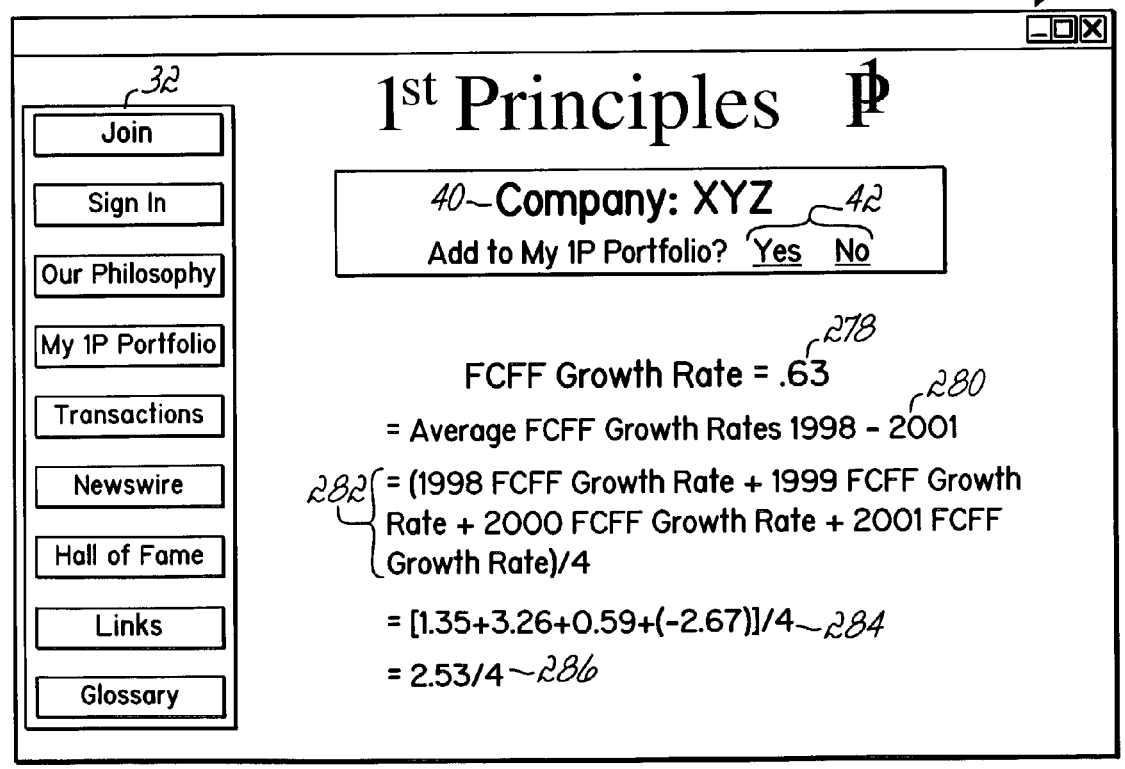

When a user selects parameter 184*a* from display screen 10*r* of FIG. 19, exemplary display screen 10*s* shown in FIG. 20 is returned. In FIG. 20, field 190 provides the identification of the selected parameter (FCFF) and its associated numeric value. Fields 192 and 194 display the formulas utilized to calculate the FCFF parameter, and fields 196*a* and 196*b* display the numeric values representing the parameters and entered into the formulas, along with the subsequent calculations utilized to determine the FCFF parameter. Fields 192 and 194 each contain a user selectable parameter 192*a*, 194*a* for drilling down to the FCFF Growth Rate. When either of these parameters 192*a*, 194*a* is selected, exemplary display screen 10*gg*, shown in FIG. 34, is returned, as described more fully below.

Figure 21:
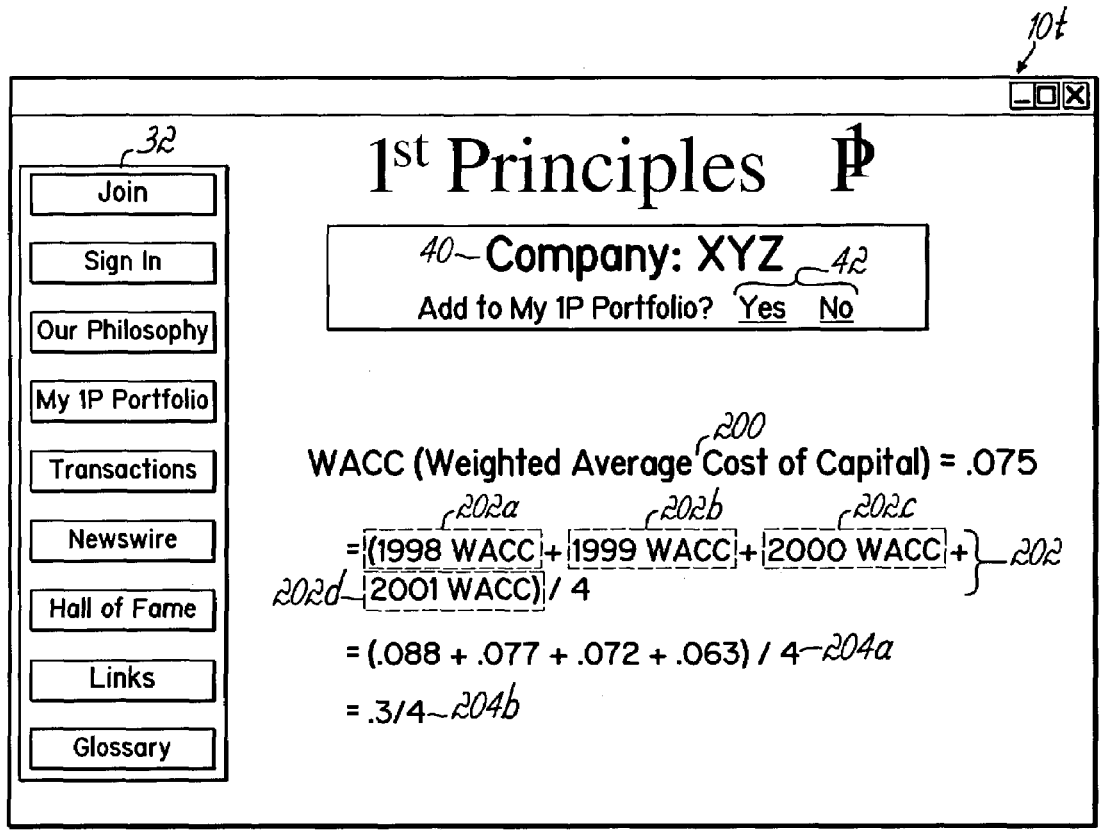
Figure 22:
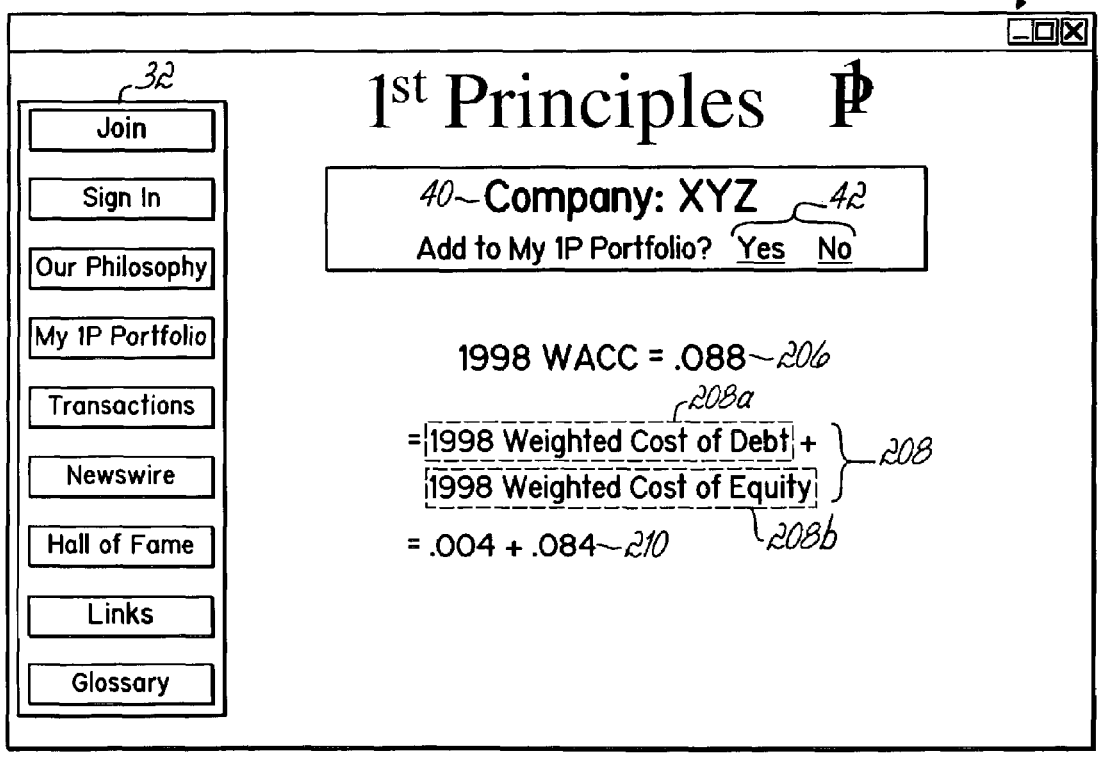
Figure 23:
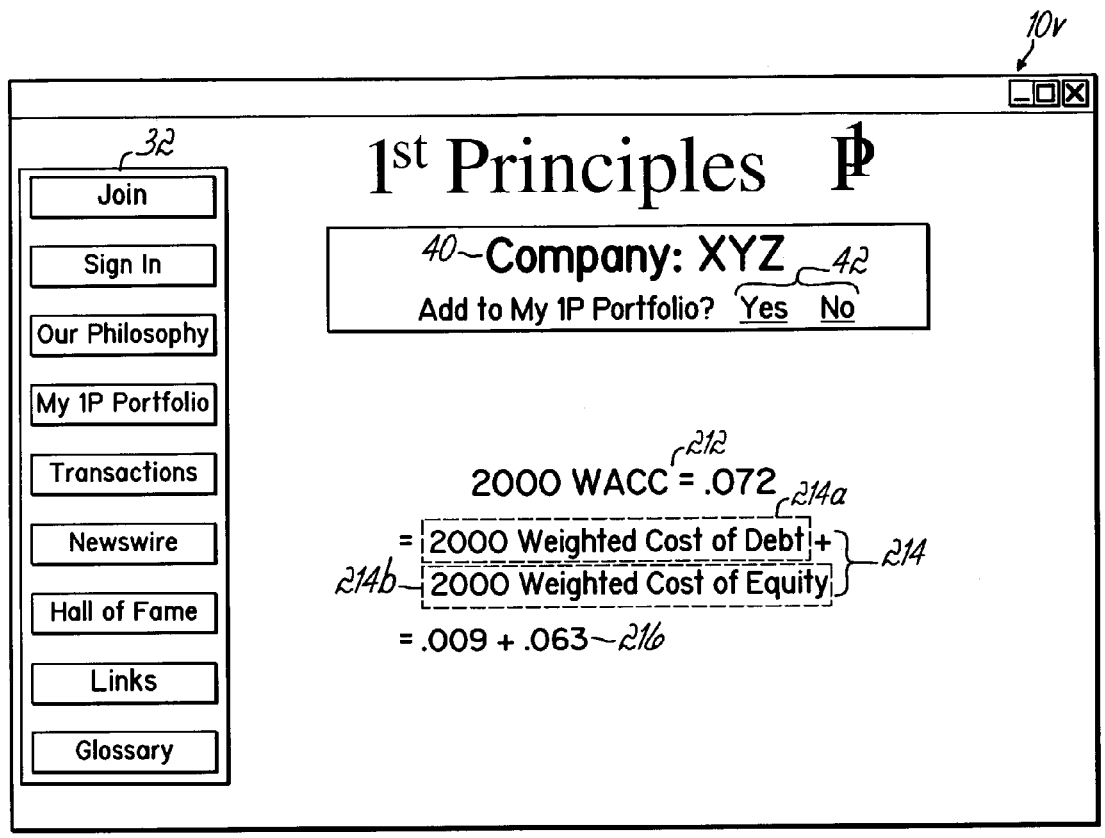
Figure 24:
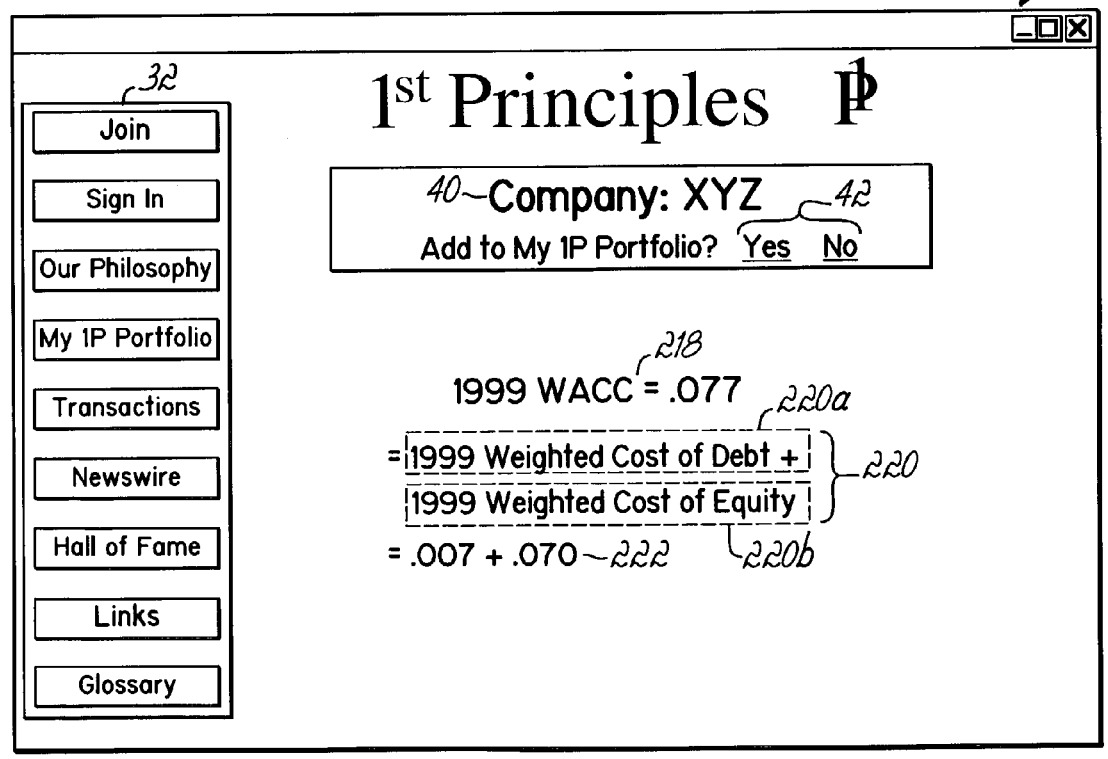
Figure 25:
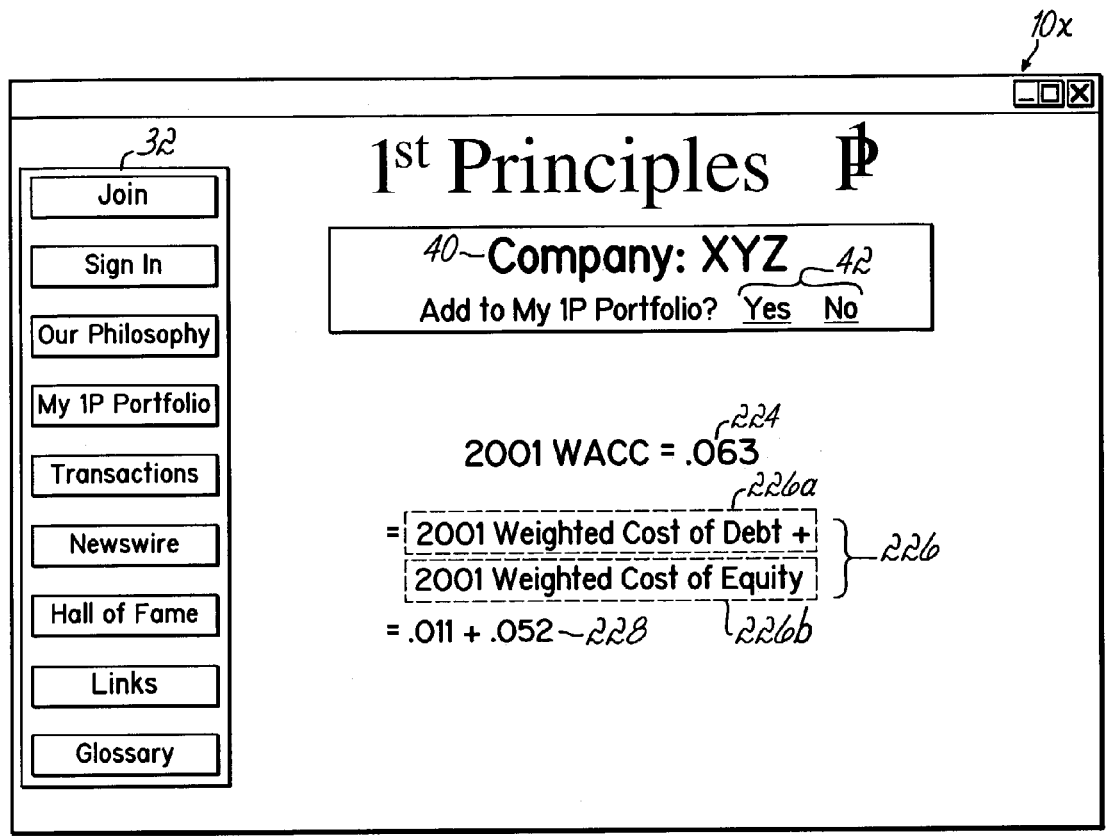
Figure 26:
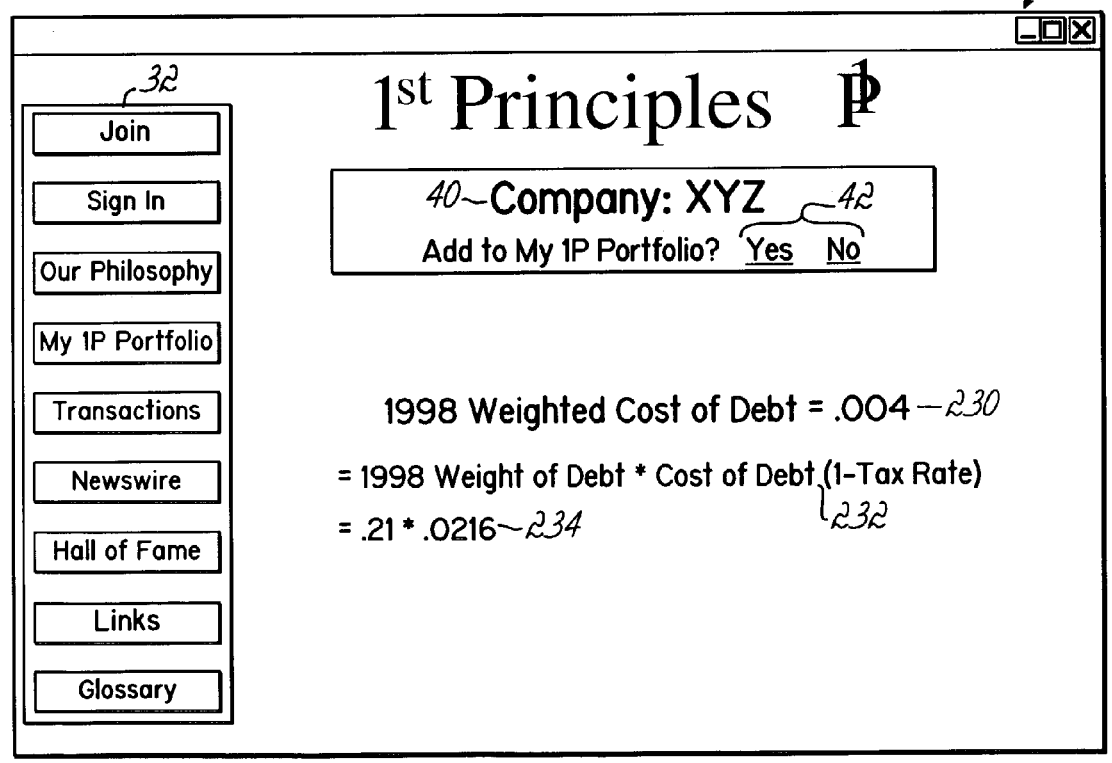
Figure 27:
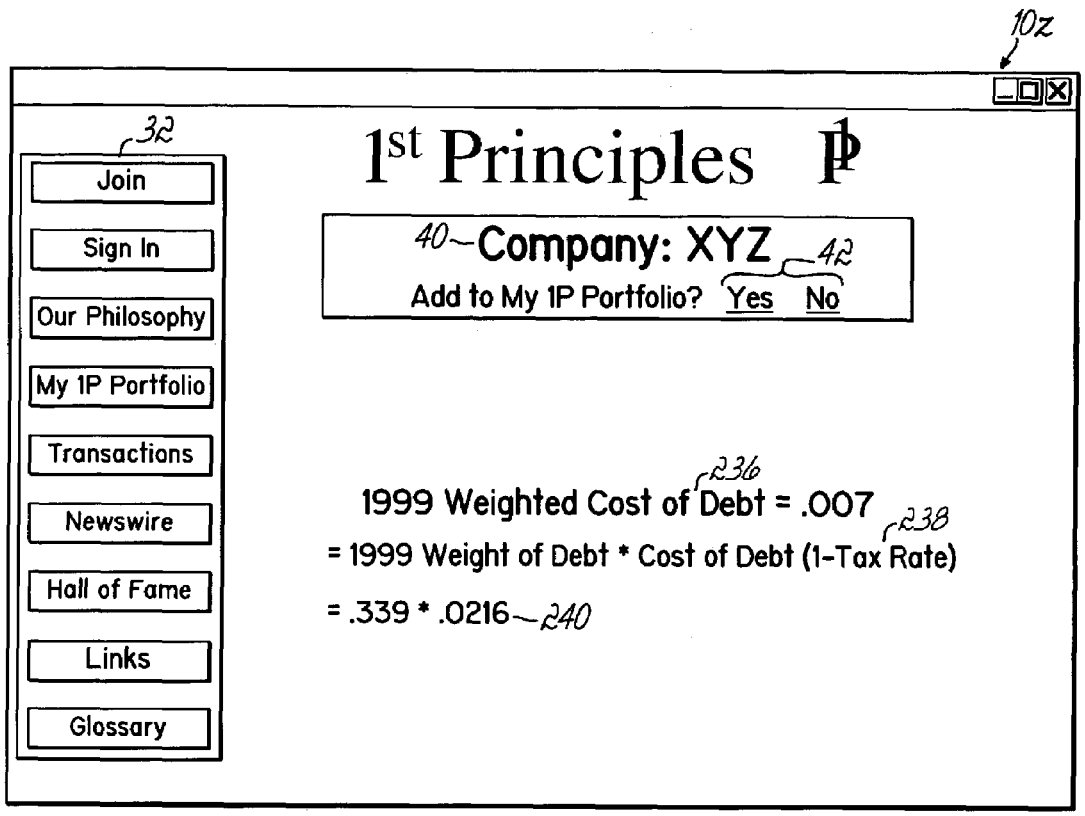
Figure 28:
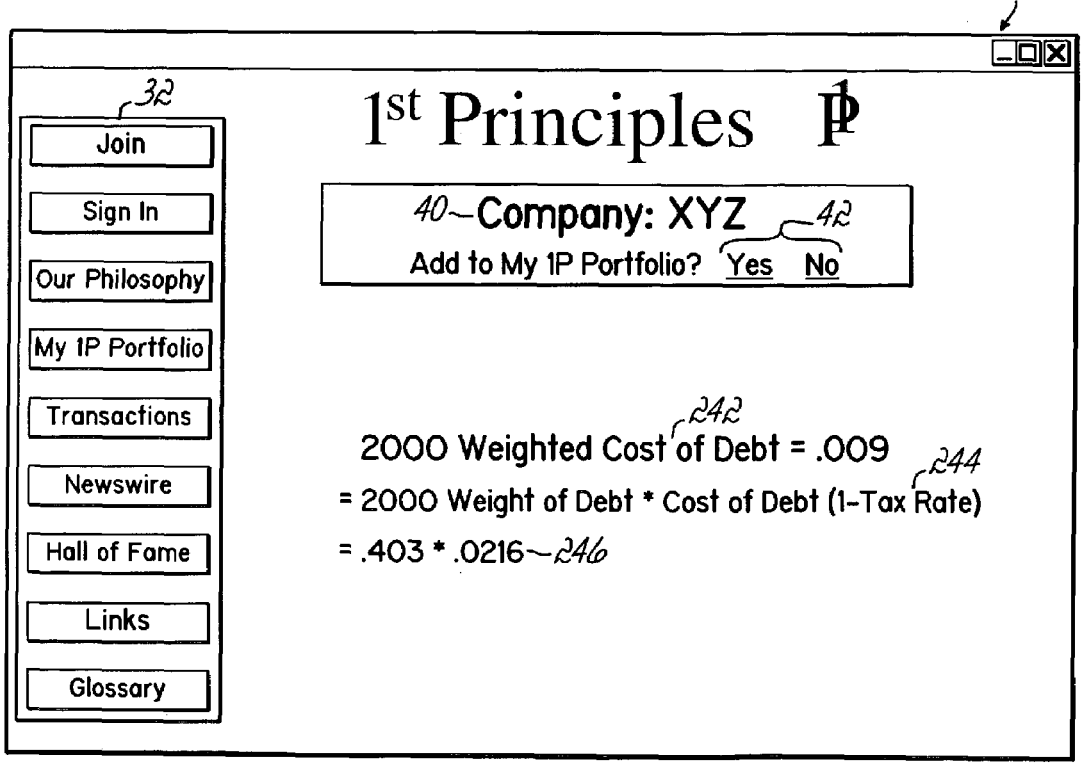
Figure 29:
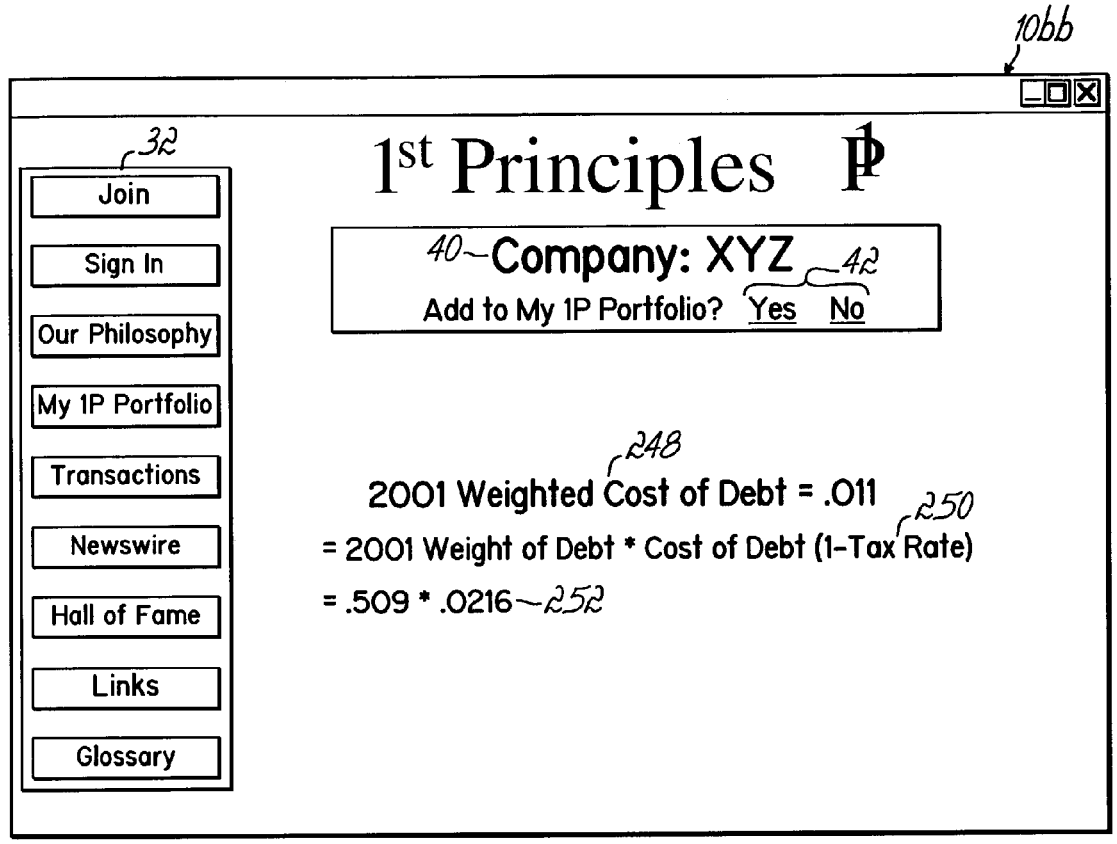
Figure 30:
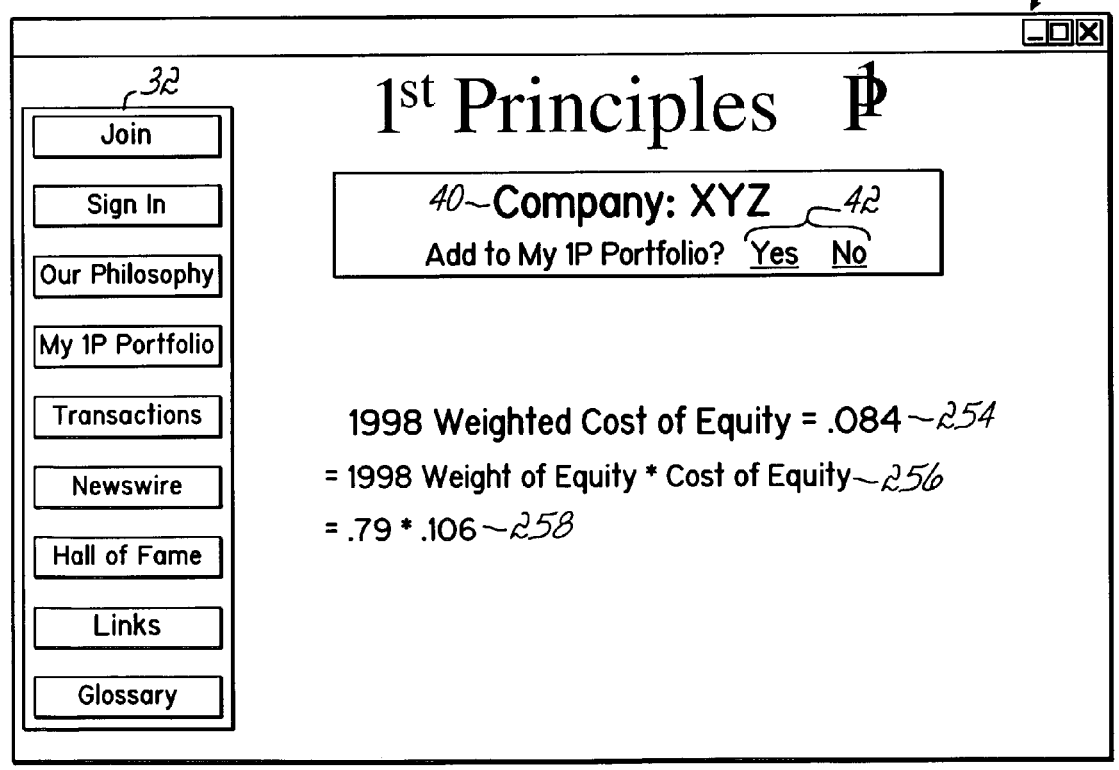
Figure 31:
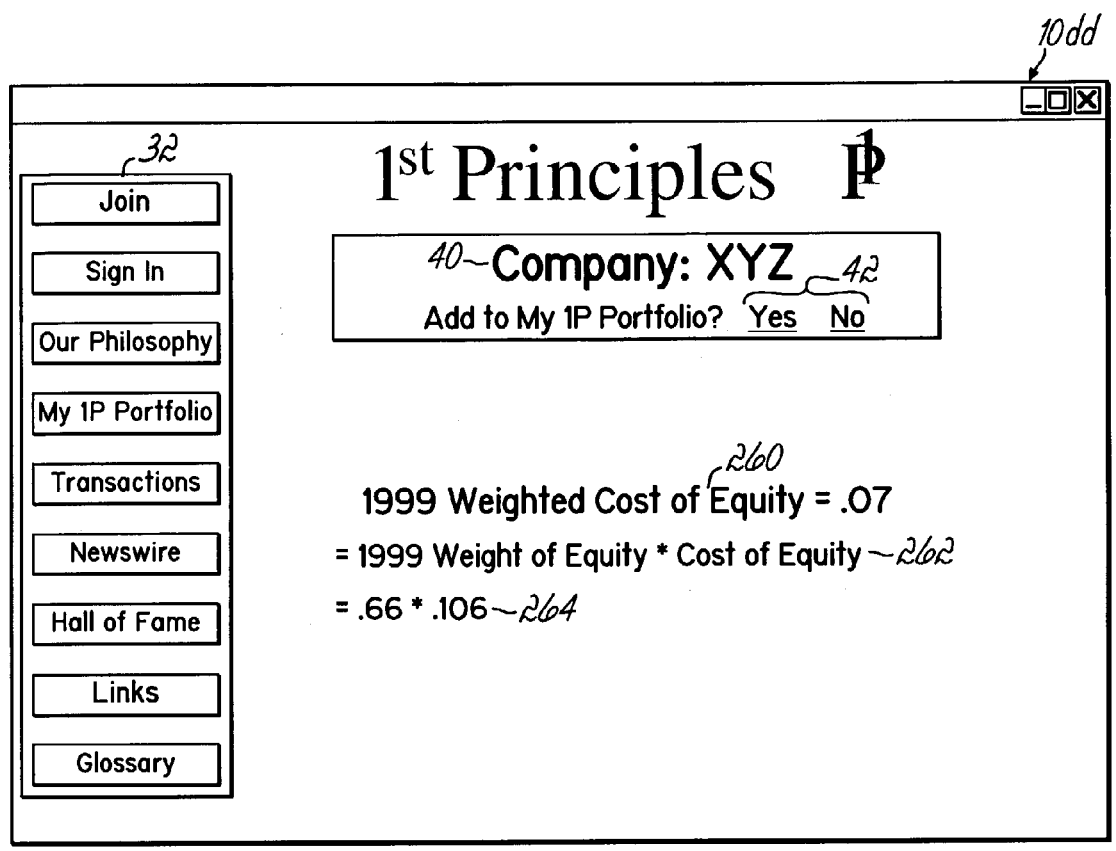
Figure 32:
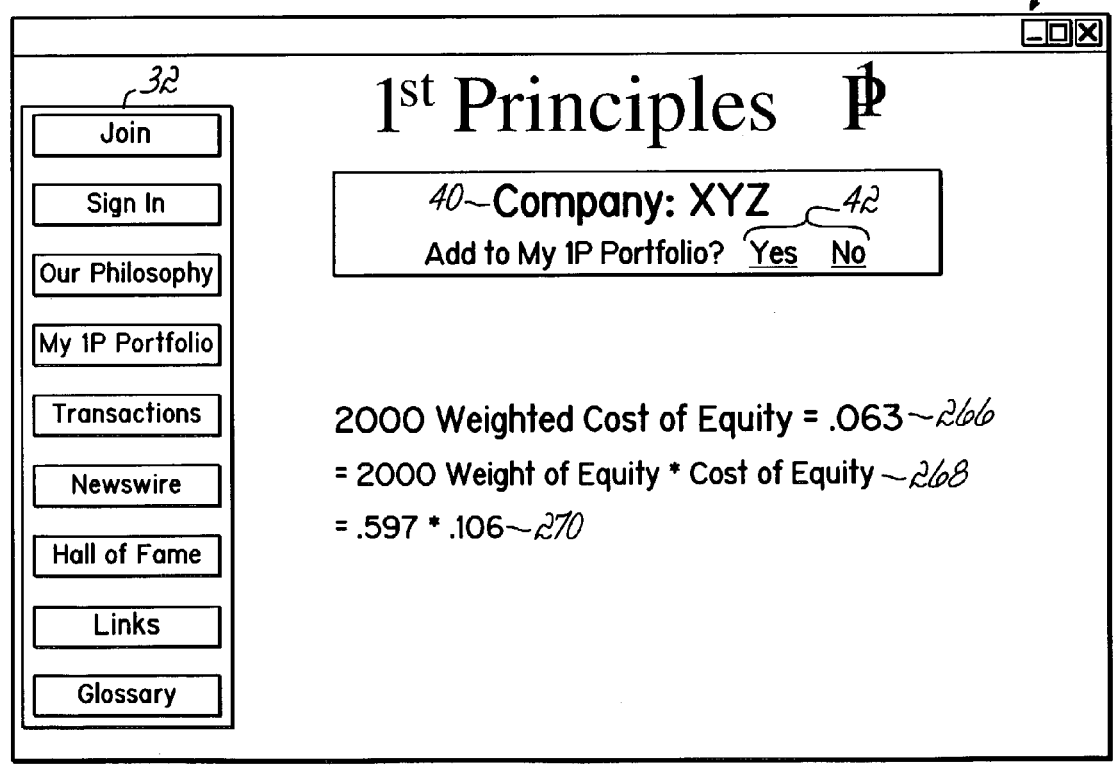
Figure 33:
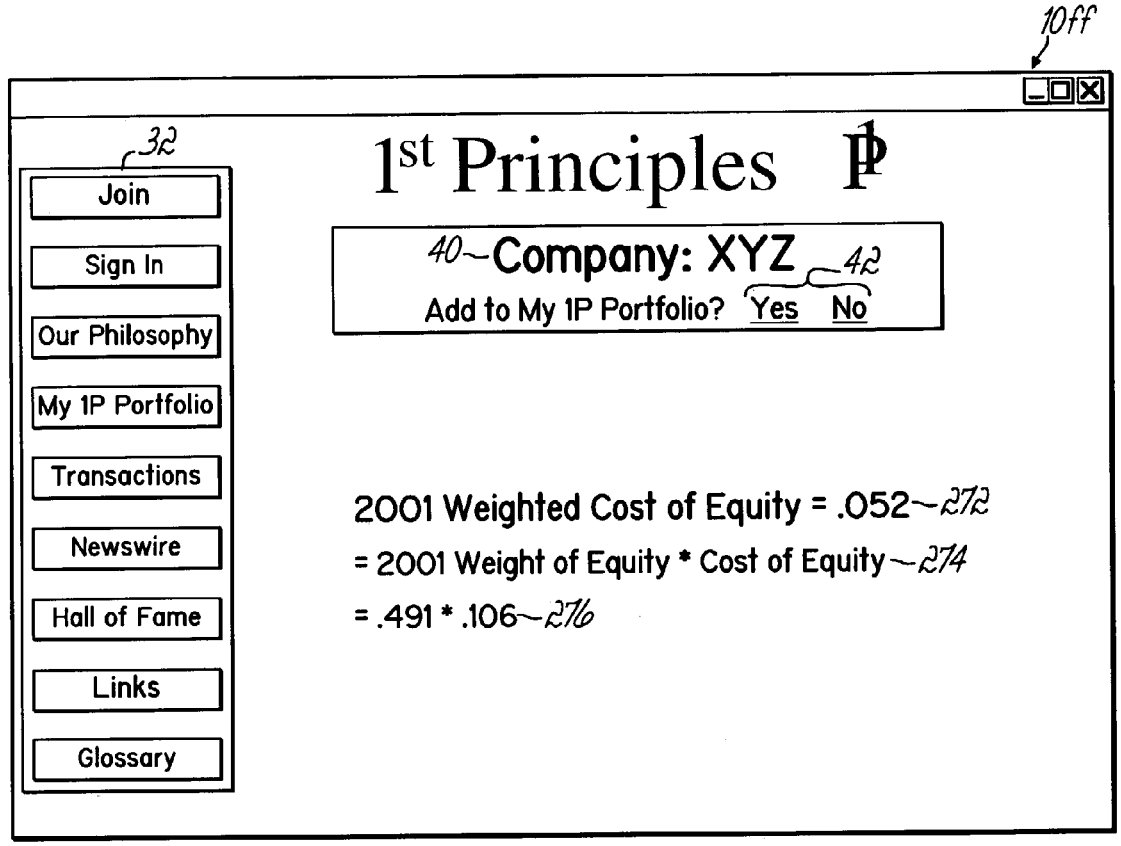

Referring to FIG. 21, there is shown an exemplary display screen 10*t* returned when a user selects parameter 184*b* (WACC) from field 184 of FIG. 19. Field 200 identifies this parameter as the Weighted Average Cost of Capital and displays its calculated numeric value. The formula used to calculate the Weighted Average Cost of Capital is provided in field 202, and the numeric values representing these parameters and entered into this formula and subsequent calculations are displayed in fields 204*a* and 204*b*. Field 202 contains user selectable parameters 202*a*-202*d*, which are discussed more fully below.

Referring now to FIGS. 22-25, exemplary display screens 10*u*-10*x* are shown and represent the displays returned when a user selects parameters 202*a*, 202*b*, 202*c*, and 202*d*, respectively, from field 202 in FIG. 21. In these displays, fields 206, 212, 218, and 224 identify the respective parameters 202*a*, 202*b*, 202*c* and 202*d* from field 202 of FIG. 21, and display their calculated numeric values. Fields 208, 214, 220, and 226 display the formulas used in calculating the annual WACC parameters, and each field 208, 214, 220, and 226 includes user selectable parameters 208*a*, 214*a*, 220*a*, and 226*a* associated with the annual weighted cost of debt, and user selectable parameters 208*b*, 214*b*, 220*b*, and 226*b* associated with the annual weighted cost of equity. Fields 210, 216, 222, and 228 display the numeric values which are represent the parameters and are entered into the formulas displayed in fields 208, 214, 220, and 226, respectively.

Referring now to FIGS. 26-29, respective display screens 10*y*, 10*z*, 10*aa*, and 10*bb* are returned when a user selects the Annual Weighted Cost of Debt parameters 208*a*, 214*a*, 220*a*, and 226*a* from respective fields 208, 214, 220, and 226 of FIGS. 22-25. In each display, fields 230, 236, 242, and 248 show the name of the selected parameters 208*a*, 214*a*, 220*a*, and 226*a*, along with their calculated numeric values. Fields 232, 238, 244, and 250 each display the respective formulas used to calculate the respective annual weighted cost of debt. Fields 234, 240, 246, and 252 each display the respective numeric values representing the parameters and entered into the formulas of fields 232, 238, 244, and 250.

Similarly, FIGS. 30-33 illustrate exemplary display screens 10*cc*-10*ff* provided when a user selects parameters 208*b*, 214*b*, 220*b*, and 226*b*, respectively, from fields 208, 214, 220, and 226 of FIGS. 22-25 to view information related to the calculation of the Annual Weighted Cost Of Equity. In FIGS. 30-33, fields 254, 260, 266, and 272 provide the numeric values for the respective Annual Weighted Cost Of Equity parameters. Fields 256, 262, 268, and 274 display the formulas used to calculate the Annual Weighted Costs Of Equity, and fields 258, 264, 270, and 276 display the numeric values representing these parameters and entered into these formulas.

Referring now to FIG. 34, there is shown an exemplary display screen 10*gg* returned when a user selects parameter 184*c* (FCFF Growth Rate) from field 184 shown in FIG. 19. This display screen 10*gg* is also returned when a user selects field 192*a* and 194*a* from fields 192 and 194, respectively, of FIG. 20. The value for the FCFF Growth Rate is provided in field 278, and formulas used to calculate the FCFF Growth Rate are displayed in fields 280 and 282. Fields 284 and 286 display the numeric values representing the parameters and entered into the formula of field 282, and subsequent calculations for determining the FCFF Growth Rate.

Figure 35:
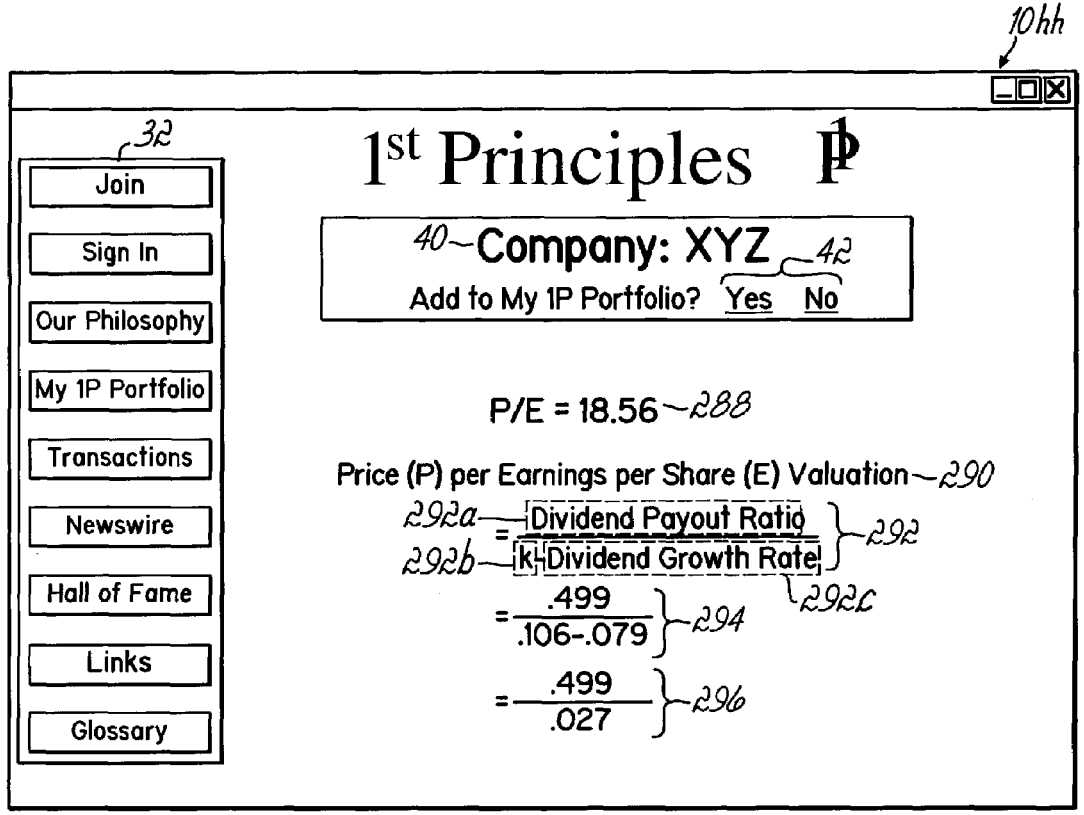

When a user selects the P/E (Price Per Earnings Per Share) valuation metric 22*a* from the display screen 10*b* of FIG. 3, an exemplary display screen 10*hh*, as depicted in FIG. 35, is returned. In FIG. 35, field 288 identifies the selected valuation metric and the numeric value calculated for the metric. Field 290 displays the name of the valuation metric as "Price Per Earnings Per Share Valuation". The formula for calculating the Price Per Earnings Per Share valuation is displayed in field 292, which has user selectable parameters 292*a*, 292*b*, and 292*c*. Fields 294 and 296 display the numeric values representing the parameters and entered into the formula of field 292, and a subsequent calculation for determining the Price Per Earnings Per Share valuation.

Figure 36:
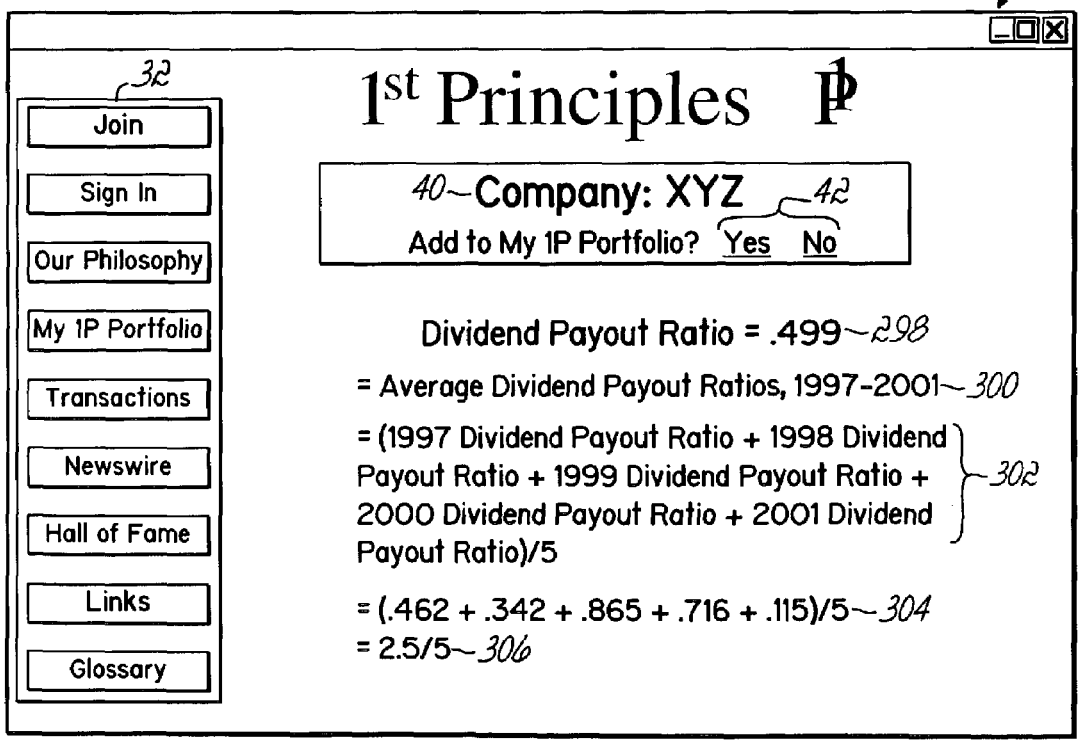

FIG. 36 depicts an exemplary display screen 10*ii* returned when a user selects the Dividend Payout Ratio parameter 292*a* from field 292 of the display 10*hh* shown in FIG. 35. Field 298 displays the numeric value of the Dividend Payout Ratio. Fields 300 and 302 display the formulas used to compute the Dividend Payout Ratio shown in field 298. Fields 304 and 306 display the numeric values representing the parameters and entered into the formulas and a subsequent calculation for determining the Dividend Payout Ratio.

When a user selects the Investor's Required Rate of Return (k) parameter 292*b* from field 292 of FIG. 35, display screen 10*e* is returned, as previously described with respect to FIG. 6. When a user selects the Dividend Growth Rate parameter 292*c* from field 292 of FIG. 35, display screen 10*f* is returned, as described above with respect to FIG. 7.

Figure 37:
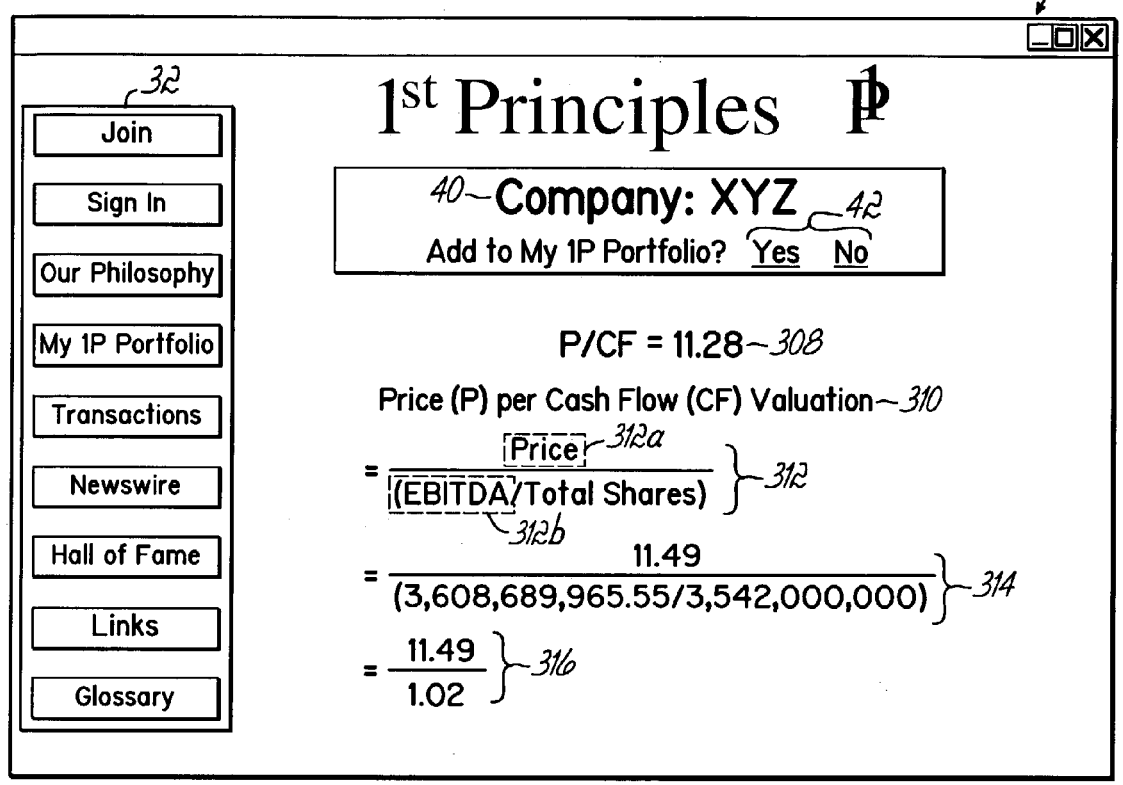
Figure 38:
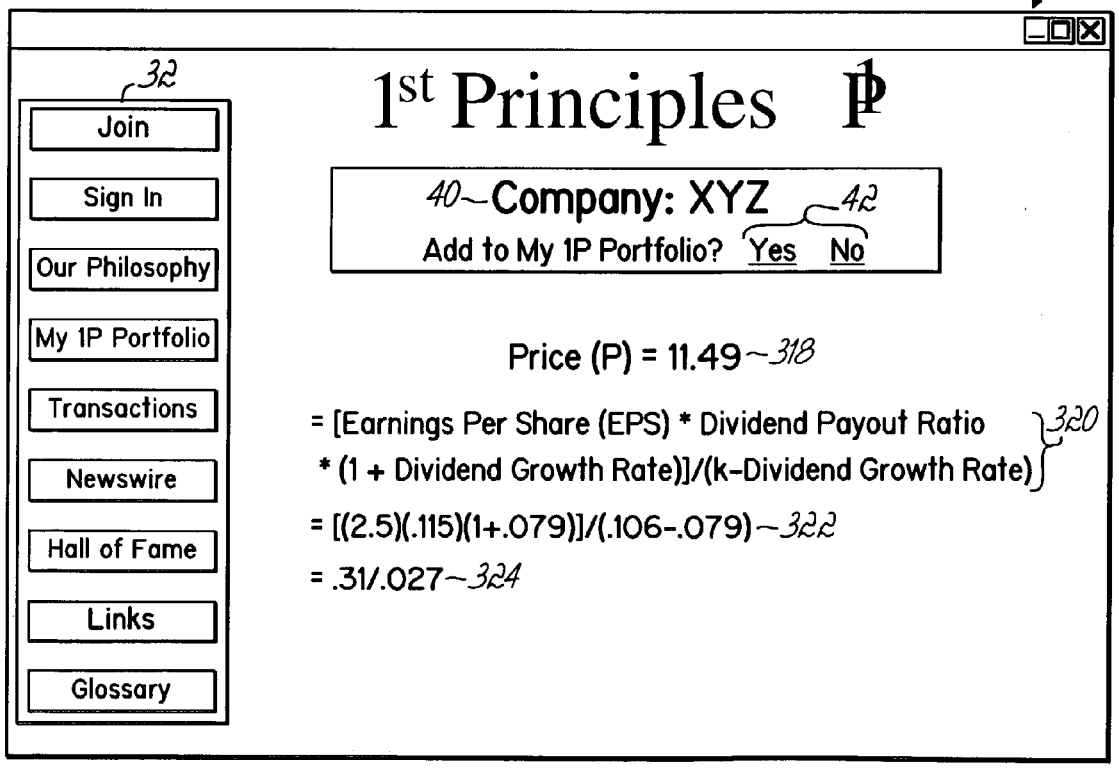

FIG. 37 depicts an exemplary display screen 10*jj* returned when a user selects the P/CF (Price Per Cash Flow) valuation metric 24*a* from the scatter chart 11 shown in FIG. 3. In FIG. 37, the identifier tag "P/CF" and the numeric value calculated for the Price Per Cash Flow valuation is displayed in field 308. Field 310 displays the name of the metric as "Price Per Cash Flow Valuation". Field 312 displays the formula used to compute the Price Per Cash Flow valuation, and fields 314 and 316 display the numeric values represented by the parameters and entered into the formula and intermediate calculations for determining the Price Per Cash Flow valuation. Field 312 has user selectable parameters 312*a* and 312*b*. When a user selects the price parameter 312*a* from field 312, an exemplary display screen 10*kk* shown in FIG. 38 is returned. In FIG. 38, the numeric value associated with the price is displayed in field 318. The formula for determining the price is displayed in field 320. Fields 322 and 324 display the numeric values representing the parameters and entered into the formula and intermediate calculations for determining the price.

Figure 39:
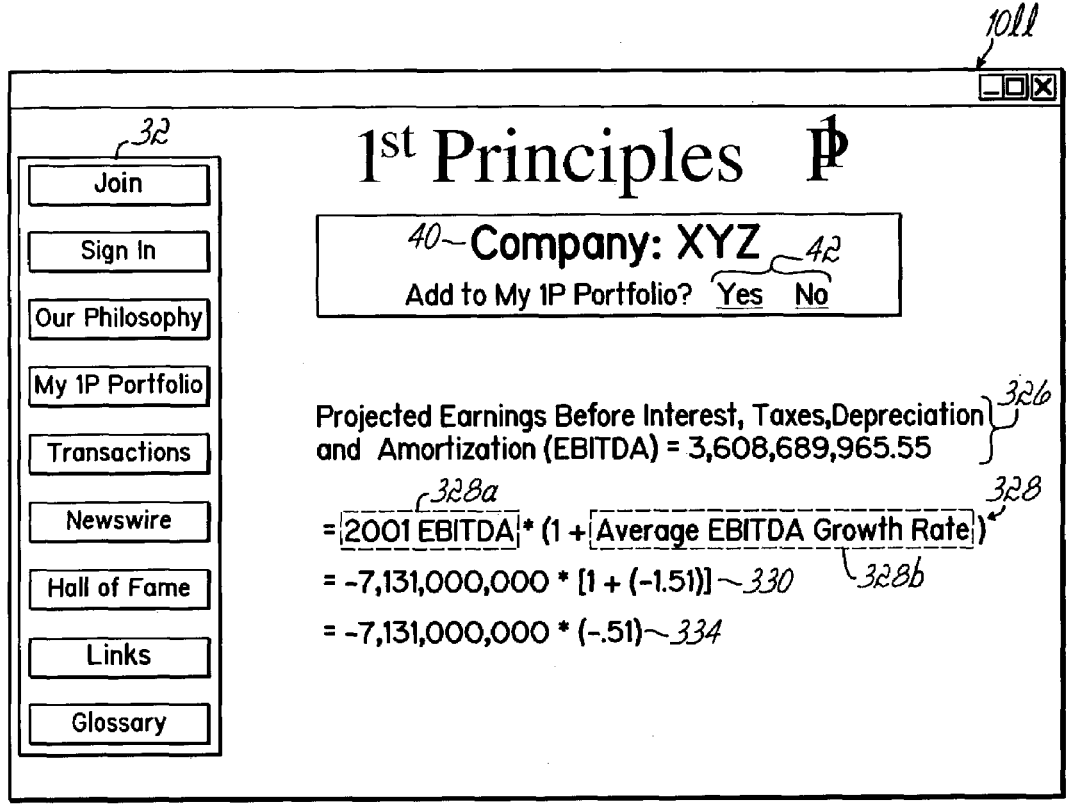
Figure 40:
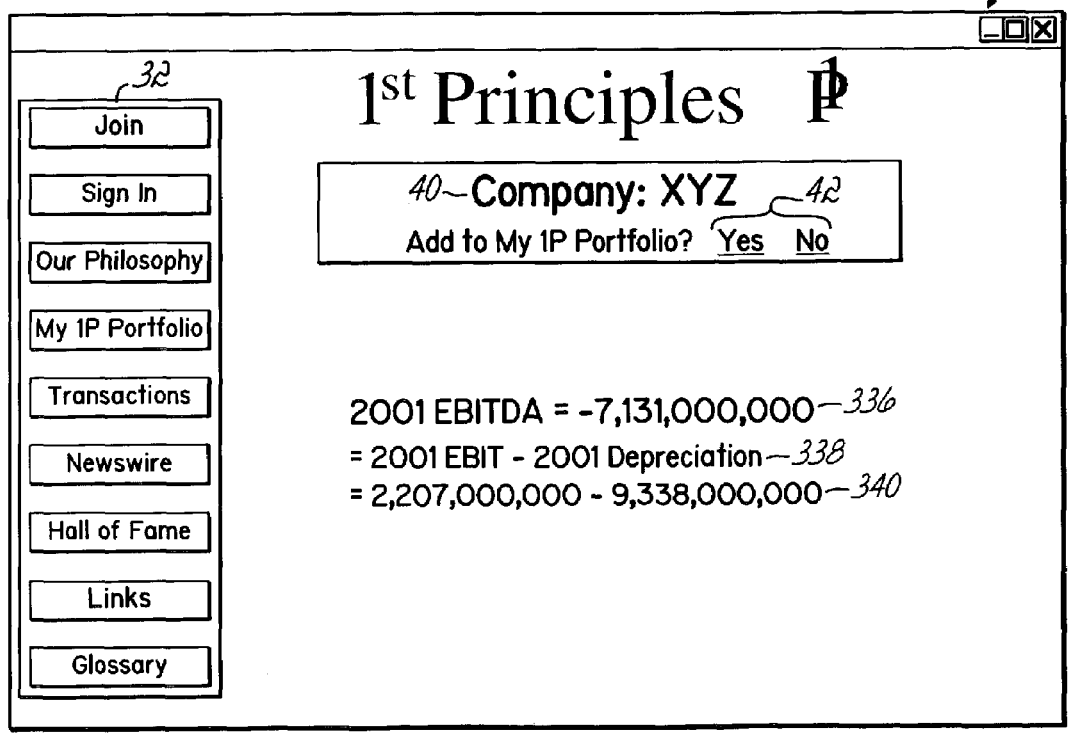
Figure 41:
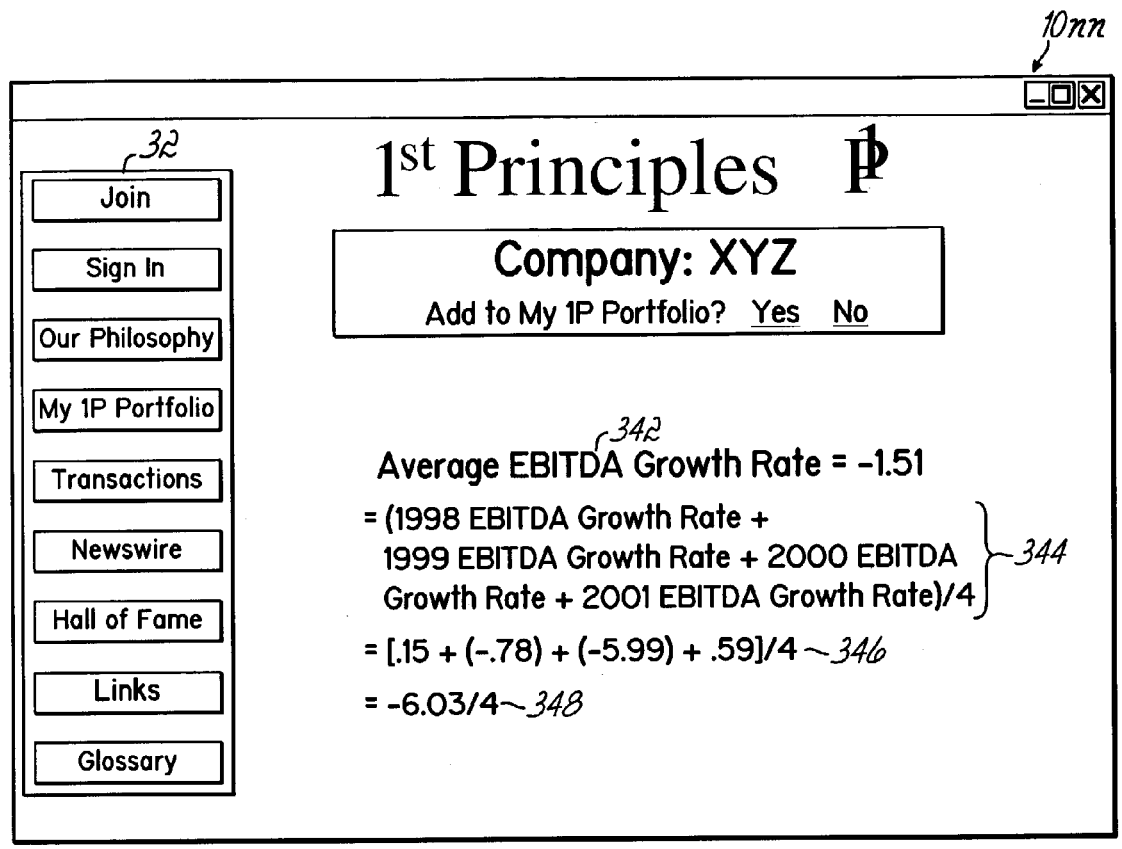

Referring to FIGS. 37 and 39, when a user selects the Projected Earnings Before Interest, Taxes, Depreciation and Amortization (EBITDA) parameter 312*b* from field 312 of FIG. 37, an exemplary display screen 10*ll*, as shown in FIG. 39, is returned. With reference to FIG. 39, field 326 displays the numeric value calculated for the EBITDA. Field 328 displays the formula used to calculate the Projected EBITDA, and fields 330 and 334 display the numeric values represented by the parameters and entered into the formula and subsequent calculations for determining the EBITDA. Field 328 includes user selected parameters 328*a* and 328*b*. When a user selects the annual EBITDA parameter 328*a* from field 328, an exemplary display screen 10*mm*, as depicted in FIG. 40, is returned. In FIG. 40, field 336 displays the numeric value calculated for the 2001 EBITDA, field 338 displays the formula used to calculate the 2001 EBITDA, and field 340 displays the numeric values representing the parameters and entered into the formula for calculating the 2001 EBITDA. When a user selects the Average EBITDA Growth Rate parameter 328*b* from field 328 in FIG. 39, an exemplary display screen 10*nn* illustrated in FIG. 41 is returned. In FIG. 41, field 342 displays the numeric value calculated for the Average EBITDA Growth Rate. Field 344 displays the formula used to calculate the Average EBITDA Growth Rate, and fields 346 and 348 display the numeric values representing the parameters and entered into the formula and subsequent calculations for determining the Average EBITDA Growth Rate.

Figure 42:
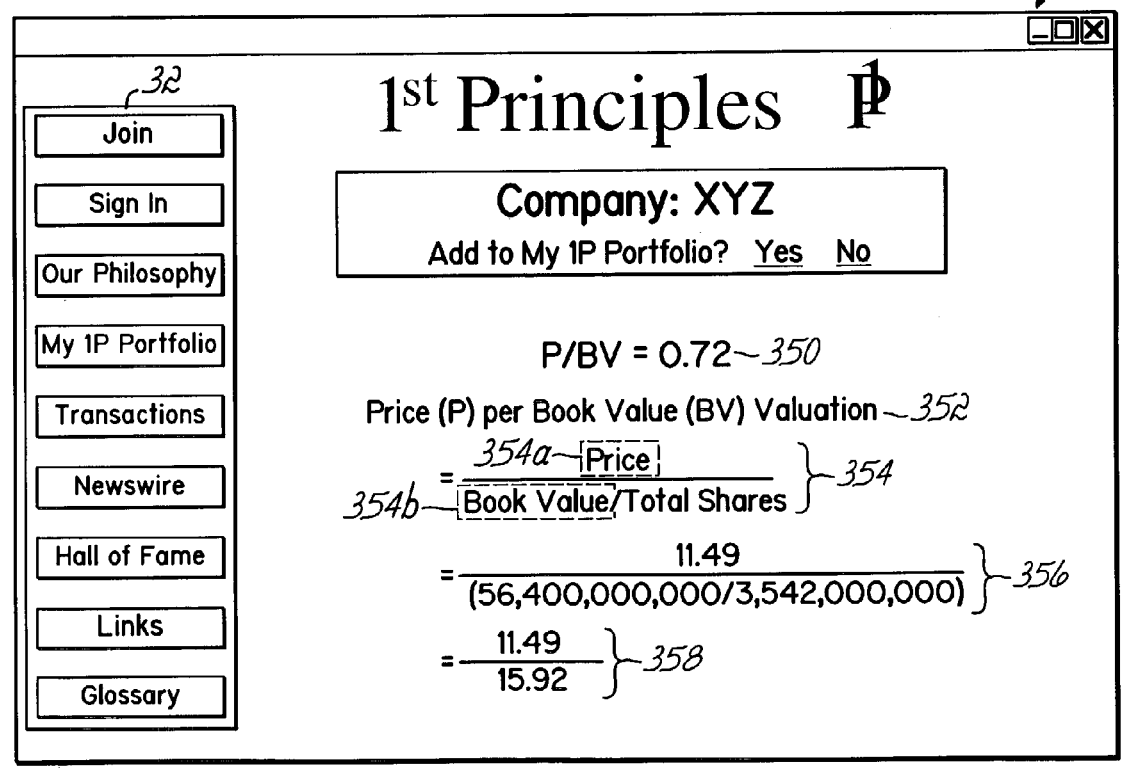
Figure 43:
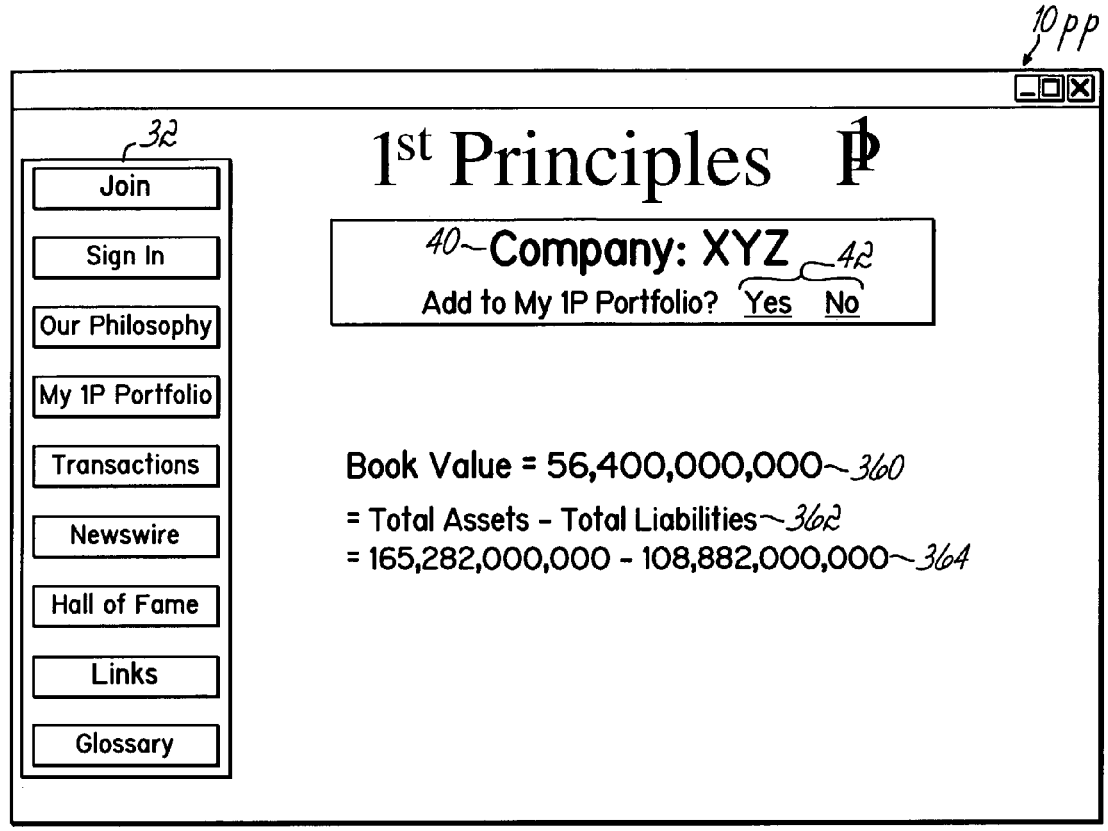

Referring now to FIG. 42, there is shown an exemplary display screen 10*oo* returned when a user selects the P/BV (Price Per Book Value) valuation metric 26*a* from the scatter chart 11 shown in FIG. 3. In FIG. 42, field 350 displays the numeric value calculated for the Price Per Book Value valuation metric. Field 352 displays the name of this metric as "Price Per Book Value Valuation". Field 354 displays the formula used to calculate the Price Per Book Value valuation metric, and includes user selectable parameters 354*a* and 354*b*.Fields 356 and 358 display the numeric values representing the parameters and entered into the formula and subsequent calculations for determining the Price Per Book Value valuation metric. When a user selects the Price parameter 354*a* in field 354, an exemplary display screen 10*kk* providing information for determining the Price parameter is returned, as discussed above with respect to FIG. 38. When a user selects the Book Value parameter 354*b* from field 354 in FIG. 42, an exemplary display screen 10*pp* is returned, as depicted in FIG. 43. In FIG. 43, the numeric value calculated for the Book Value is displayed in field 360. Field 362 displays the formula used to calculate the Book Value shown in field 360. Field 364 displays the numeric values representing the parameters and entered into the formula of field 362.

Figure 44:
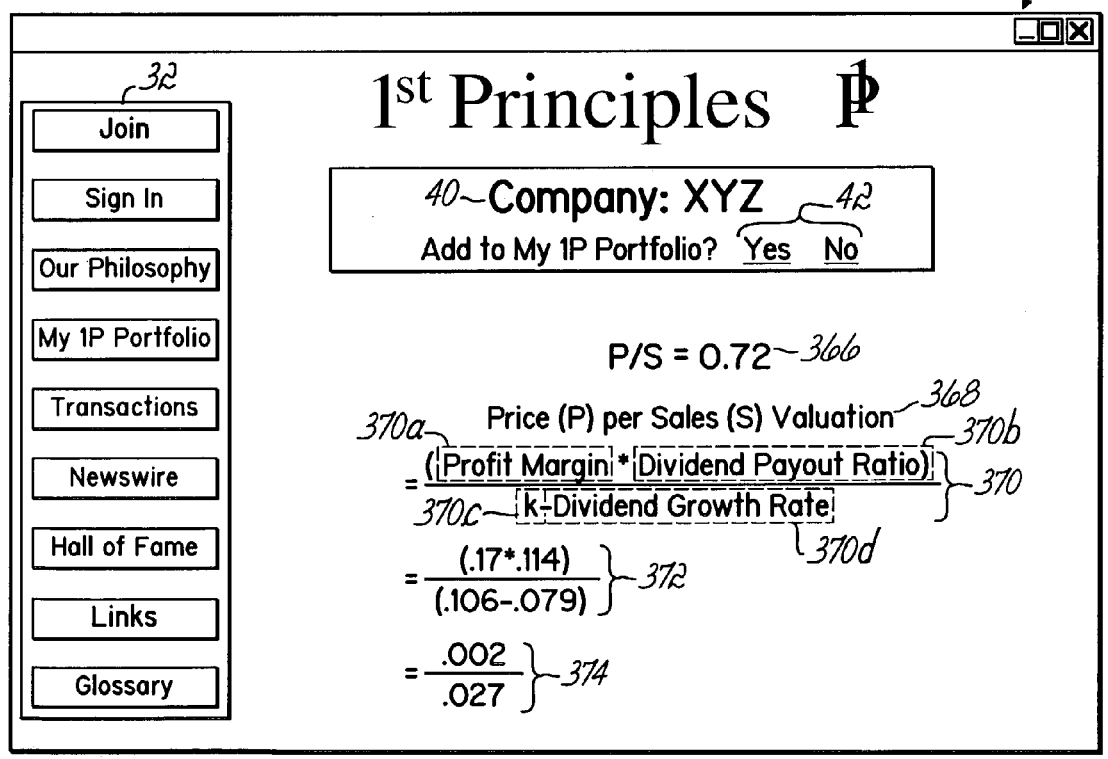
Figure 45:
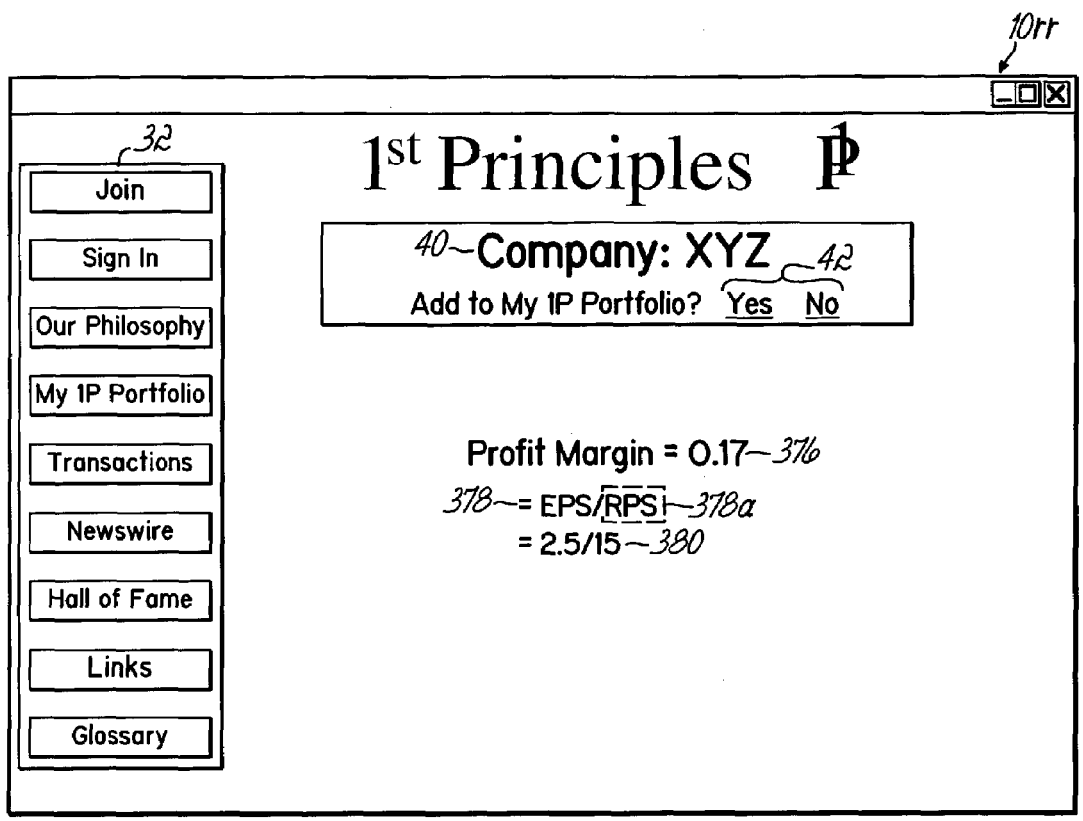
Figure 46:
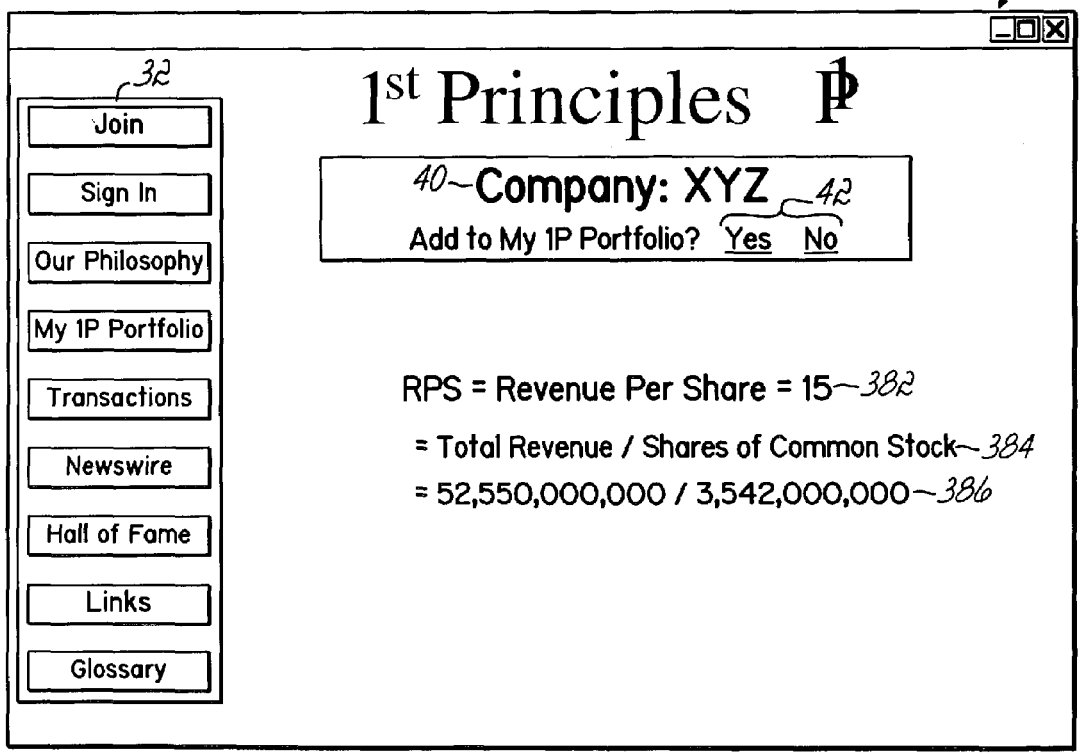

Referring now to FIG. 44, there is shown an exemplary display screen 10*qq* returned when a user selects the P/S (Price Per Sales) valuation metric 28*a* from the scatter chart 11 shown in FIG. 1. In FIG. 44, field 366 displays the numeric value calculated for the Price Per Sales valuation metric. Field 368 displays the name of the metric as "Price Per Sales Valuation". Field 370 displays the formula used to calculate the Price Per Sales valuation metric, and fields 372 and 374 display the numeric values representing the parameters and entered into the formula and a subsequent calculation. The formula displayed in field 370 includes user selectable parameters 370*a*, 370*b*, 370*c* and 370*d*. When a user selects the Profit Margin parameter 370*a* from field 370, an exemplary display screen 10*rr* shown in FIG. 45 is returned. In FIG. 45, field 376 displays the value calculated for the Profit Margin. Field 378 displays the formula used to calculate the Profit Margin and contains a user selectable parameter 378*a*. Field 380 displays the numeric values representing the parameters and entered into the formula of field 378. When a user selects parameters 370*b*, 370*c*, or 370*d* from field 370 in FIG. 44, appropriate display screens for Dividend Payout Ratio (such as display screen 10*g* of FIG. 8), Investors Required Date of Return (k), and Dividend Growth Rate are returned, as described above with respect to FIGS. 6-8. When a user selects the Revenue Per Share parameter (RPS) 378*a* from field 378 in FIG. 45, an exemplary display screen 10*ss*, as illustrated in FIG. 46, is returned. In FIG. 46, field 382 shows the numeric value calculated for the Revenue Per Share parameter. Field 384 displays the formula used to calculate the Revenue Per Share, and field 386 displays the numeric values representing the parameters and entered into the formula.

Figure 47:
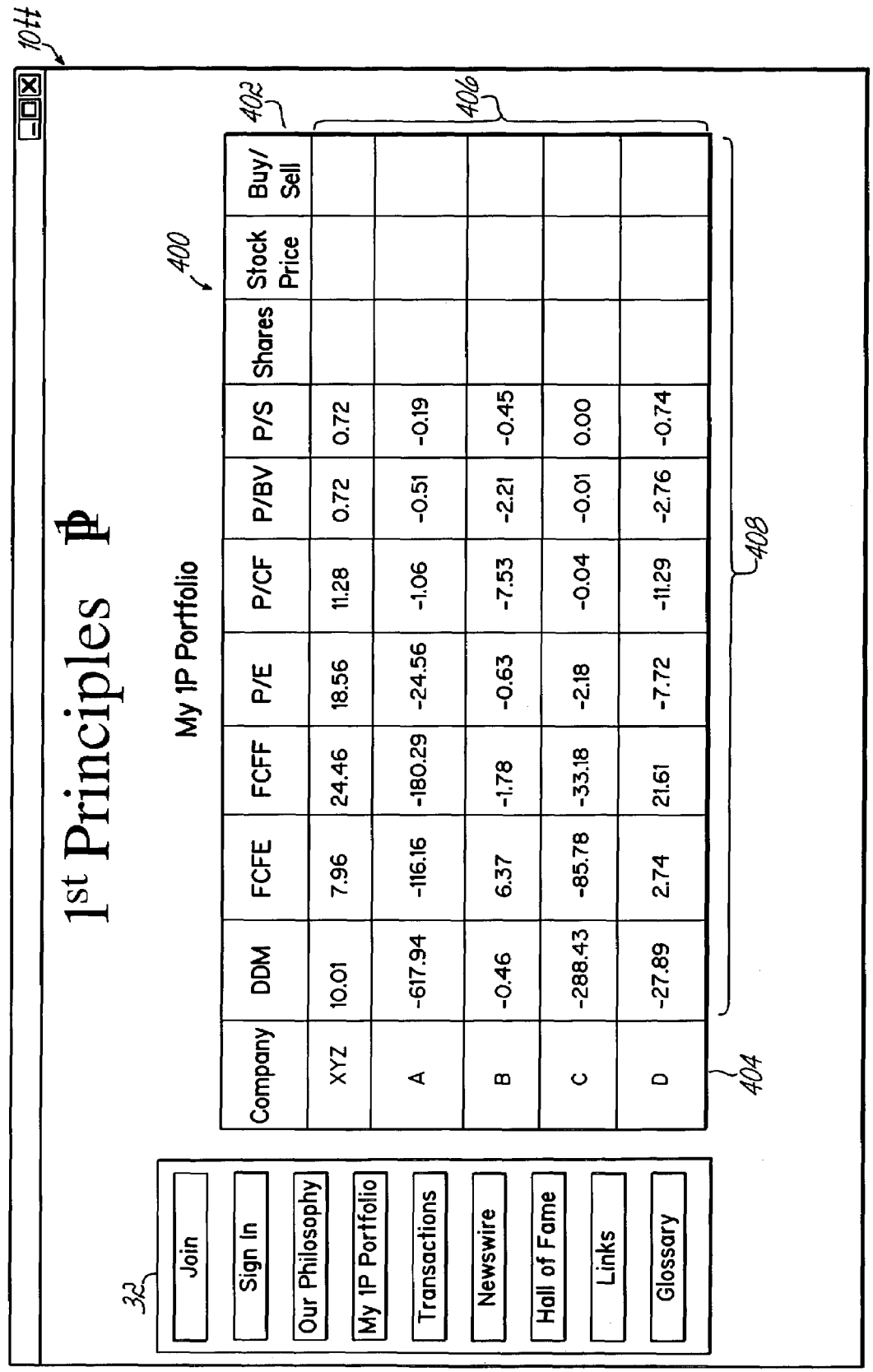
FIG. 47 is another exemplary display of the present invention.

Referring now to FIG. 47, there is shown an exemplary display screen 10*tt* with a Table 400 that displays financial information for various securities selected for display by the user. To include financial information for a particular security in the table 400, the user indicates that the information should be included in the table by selecting the appropriate response in field 42 of any of the exemplary display screens 10 discussed above. In Table 400, a header row 402 displays the title for various columns arranged beneath the header row 402. In the exemplary embodiment shown, the header row contains column titles for company name and the seven valuation metrics, and further includes column titles for displaying additional information, such as the number of shares held by the user, the current stock price of the security, and a link to a brokerage allowing the user to buy or sell shares of the security indicated. The first column of cells beneath the header row displays the various names associated with the selected securities. The remaining columns 406 and rows 408 display the values that have been calculated for the selected securities, as described above.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A method of displaying financial information related to publicly traded securities, comprising:
   identifying a desired security;
   obtaining data regarding the security from a database;
   determining at least two different metrics for valuing the security using the data from the database, the at least two metrics selected from the following:
      free cash flow to equity valuation,
      free cash flow to the firm valuation,
      price per earnings per share valuation,
      price per sales valuation, price per cash flow valuation,
      price per book value valuation, and
      dividend discount model valuation; and
   displaying the at least two metrics on a computer output device;
   wherein the at least two valuation metrics are displayed on a scatter chart having an axis with positive and negative ordinates.

2. The method of claim 1 wherein at least three valuation metrics for the security are determined and displayed.

3. The method of claim 2, wherein seven metrics for the security are determined and displayed.

4. The method of claim 1, further comprising storing data related to the at least two valuation metrics.

5. The method of claim 1, further comprising displaying information related to the determination of a particular metric and the data obtained from the database when requested by a user.

6. The method of claim 5, wherein information related to the determination of a particular valuation metric and data from the database are displayed when a user selects an item related to the metric from a computer screen by moving a cursor on the screen to the item and indicating the item.

7. The method of claim 1, further comprising:
identifying at least a second security;
obtaining data regarding the second security from a database;
determining at least two different metrics for the valuing the second security
using the data from the database, the at least two metrics selected from the following:
free cash flow to equity valuation,
free cash flow to the firm valuation,
price per earnings per share valuation,
price per sales valuation,
price per cash flow valuation,
price per book value valuation, and
dividend discount model valuation; and
graphically displaying on the scatter chart the at least two metrics for the first and second securities on the computer output device.

8. The method of claim 1 wherein the method is implemented on a computer system having at least a first computer in communication with a second computer, and wherein:
identifying a desired security is performed on the second computer and received at the first computer;
determining the at least two metric is performed by the first computer; and
displaying the at least two metrics is performed by the second computer.

9. The method of claim 8, wherein the computer system further includes a third computer adapted to facilitate the purchase or sale of a security, the method further comprising:
linking to the third computer to purchase or sell a security.

10. A method of providing financial data over a network including at least first and second computers, the method comprising:
receiving a request at the first computer from a user at the second computer, the request identifying a desired security;
obtaining data regarding the security from a database at the first computer;
determining at least two different metrics for valuing the security at the first computer using the data, the at least two metrics selected from the following:
free cash flow to equity valuation, free cash flow to the firm valuation, price per earnings per share valuation, price per sales valuation, price per cash flow valuation, price per book value valuation, and dividend discount model valuation; and
delivering a graphical display of the at least two metrics on a scatter chart from the first computer to the second computer.

11. The method of claim 10, wherein delivering a graphical display of the at least two metrics to the second computer comprises delivering the graphical display with an Internet web page.

12. A system for providing financial information related to publicly trades securities, comprising a first computer configured to receive a request identifying a desired security; to obtain data regarding the security from a database; to determine at least two different metrics for valuing the security, the at least two metrics selected from:
free cash flow to equity valuation,
free cash flow to the firm valuation,
price per earnings per share valuation,
price per sales valuation,
price per cash flow valuation,
price per book value valuation,
and dividend discount model valuation; and to deliver a graphical display of the at least two metrics on a scatter chart to an output device.

13. The system of claim 12, further comprising a second computer in communication with said first computer, said second computer configured to receive information from said first computer and to display said information on the scatter chart.

14. The system of claim 13, wherein said first computer is configured to receive the request from said second computer and to deliver said graphical display to an output device at said second computer.

* * * * *

UNITED STATES PATENT AND TRADEMARK OFFICE
CERTIFICATE OF CORRECTION

| | | |
|---|---|---|
| PATENT NO. | : 7,644,024 B2 | Page 1 of 2 |
| APPLICATION NO. | : 10/427603 | |
| DATED | : January 5, 2010 | |
| INVENTOR(S) | : Dainoff et al. | |

It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 1345 days.

Delete "1345 days" and insert -- 2014 days --.

Column 3
Line 28, reads "cash flow s to its stockholders" and should read -- cash flows to its stockholders --.

Column 4
Line 17, reads "As result of the" and should read -- As a result of the --.

Column 5
Lines 20-21, reads "The numeric values representing the parameters are entered into the formula of field 54" and should read -- The numeric values representing the parameters entered into the formula of field 54 --.

Column 5
Line 30, reads "Numeric values representing the parameters are entered into" and should read -- Numeric values representing the parameters entered into --.

Column 7
Line 45, reads "values which are represent the" and should read -- values which represent the --.

Column 10
Line 42, reads "spirit of applicant's general inventive" and should read -- spirit of applicants' general inventive --.

Column 11
Line 35, CLAIM 8, reads "determining the at least two metric is performed" and should read -- determining the at least two metrics is performed --.

Signed and Sealed this

Tenth Day of August, 2010

David J. Kappos
*Director of the United States Patent and Trademark Office*

Column 12
Line 22, CLAIM 12, reads "publicly trades securities," and should read -- publicly traded securities, --.